(12) United States Patent
Cerecke et al.

(10) Patent No.: US 8,886,453 B2
(45) Date of Patent: Nov. 11, 2014

(54) SYSTEM AND METHOD FOR EFFICIENT ROUTING ON A NETWORK IN THE PRESENCE OF MULTIPLE-EDGE RESTRICTIONS AND OTHER CONSTRAINTS

(75) Inventors: Carl David James Cerecke, Christchurch (NZ); David John Mitchell, Christchurch (NZ); Ralph James Mason, Christchurch (NZ); Jason Koch, Aliso Viejo, CA (US); Howard Jelinek, Aliso Viejo, CA (US)

(73) Assignee: Telogis, Inc., Aliso Viejo, CA (US)

( * ) Notice: Subject to any disclaimer, the term of this patent is extended or adjusted under 35 U.S.C. 154(b) by 79 days.

(21) Appl. No.: 13/163,630

(22) Filed: Jun. 17, 2011

(65) Prior Publication Data

US 2012/0158299 A1    Jun. 21, 2012

Related U.S. Application Data

(63) Continuation-in-part of application No. 12/633,481, filed on Dec. 8, 2009, now Pat. No. 8,423,283, and a continuation-in-part of application No. 12/954,547, filed on Nov. 24, 2010, now Pat. No. 8,706,409.

(60) Provisional application No. 61/121,891, filed on Dec. 11, 2008, provisional application No. 61/281,859, filed on Nov. 24, 2009, provisional application No. 61/394,287, filed on Oct. 18, 2010.

(51) Int. Cl.
*G01C 21/34* (2006.01)
*G08G 1/00* (2006.01)

(52) U.S. Cl.
CPC ........ *G01C 21/3446* (2013.01); *G01C 21/3469* (2013.01); *G01C 21/3484* (2013.01); *G08G 1/20* (2013.01)
USPC ............ 701/422; 701/423; 701/424; 701/482

(58) Field of Classification Search
USPC ........ 701/400, 410, 411, 414, 415, 416, 418, 701/420, 423, 424, 425, 428, 435, 439, 467, 701/532, 533, 117, 422; 340/905, 995.19, 340/995.2, 995.21
See application file for complete search history.

(56) References Cited

U.S. PATENT DOCUMENTS 4,926,336 A * 5/1990 Yamada ..................... 701/533
5,610,821 A * 3/1997 Gazis et al. ................ 701/420

(Continued)

OTHER PUBLICATIONS

International Search Report and the Written Opinion of the International Searching Authority from International Application No. PCT/US2009/067164 dated Feb. 15, 2010.

(Continued)

*Primary Examiner* — Tuan C. To
*Assistant Examiner* — Dale W Hilgendorf
(74) *Attorney, Agent, or Firm* — Knobbe Martens Olson & Bear LLP

(57) ABSTRACT

Embodiments provide systems and methods that find the quickest route between two locations on a graph with multi-edge constraints in a time and space efficient manner. In some embodiments, Dijkstra's algorithm is split into separate universes when a) a multiple-edge constraint is reached, and b) along each edge of a multi-edge constraint. In some embodiments, the split is performed for the purpose of finding the quickest (i.e. lowest weighted) route to the intersect ion(s) at the end of the constraints. These universes, in some embodiments, are merged or discarded when the intersection at the end of the constraint is found. Using these systems and methods, in some embodiments, the shortest path between two locations of a multi-edge constrained road network can be efficiently determined.

48 Claims, 30 Drawing Sheets

(56) References Cited

U.S. PATENT DOCUMENTS

| | | | |
|---|---|---|---|
| 5,657,231 A * | 8/1997 | Nobe et al. | 701/428 |
| 6,154,658 A * | 11/2000 | Caci | 455/466 |
| 6,295,503 B1 * | 9/2001 | Inoue et al. | 701/410 |
| 6,317,686 B1 * | 11/2001 | Ran | 701/533 |
| 6,321,161 B1 * | 11/2001 | Herbst et al. | 701/411 |
| 7,062,380 B2 * | 6/2006 | Oonishi et al. | 701/418 |
| 7,356,405 B1 * | 4/2008 | Nesbit | 701/425 |
| 7,565,155 B2 * | 7/2009 | Sheha et al. | 701/533 |
| 7,778,773 B2 * | 8/2010 | Yaqub et al. | 701/412 |
| 7,865,298 B2 * | 1/2011 | Macneille et al. | 701/123 |
| 8,285,696 B2 * | 10/2012 | Droznin et al. | 707/706 |
| 2003/0031167 A1 | 2/2003 | Singh et al. | |
| 2003/0197612 A1 | 10/2003 | Tanaka et al. | |
| 2003/0223408 A1 | 12/2003 | Chen et al. | |
| 2004/0039520 A1 | 2/2004 | Khavakh et al. | |
| 2004/0088392 A1 | 5/2004 | Barrett et al. | |
| 2004/0104842 A1 | 6/2004 | Drury et al. | |
| 2005/0043884 A1 * | 2/2005 | Atarashi | 340/995.19 |
| 2005/0107951 A1 * | 5/2005 | Brulle-Drews et al. | 701/209 |
| 2006/0097855 A1 | 5/2006 | Turnbull et al. | |
| 2006/0241854 A1 | 10/2006 | Tu et al. | |
| 2007/0027612 A1 | 2/2007 | Barfoot et al. | |
| 2007/0106465 A1 * | 5/2007 | Adam et al. | 701/209 |
| 2007/0156326 A1 | 7/2007 | Nesbitt | |
| 2007/0162372 A1 | 7/2007 | Anas | |
| 2007/0208492 A1 | 9/2007 | Downs et al. | |
| 2007/0263590 A1 | 11/2007 | Abileah et al. | |
| 2008/0125958 A1 * | 5/2008 | Boss et al. | 701/123 |
| 2008/0183376 A1 | 7/2008 | Knockeart et al. | |
| 2009/0228317 A1 * | 9/2009 | Pfeifle et al. | 705/7 |
| 2010/0036599 A1 | 2/2010 | Froeberg et al. | |
| 2010/0088163 A1 * | 4/2010 | Davidson et al. | 705/11 |
| 2012/0016582 A1 | 1/2012 | Cerecke et al. | |

OTHER PUBLICATIONS

International Search Report and Written Opinion, International Application No. PCT/US2011/56778 dated Mar. 28, 2012.

* cited by examiner

Priority Queue

| Intersection: A |
| Universe: First |
| Cost: 0 |
| No targets |
| No route |

Figure 2

Example Costs for A to E  =  C1 + C2 + C7
 or  C1 + C2 + C5 + C8
 or  C1 + C3 + C8
 or  C1 + C3 + C6 + C7

SYSTEM AND METHOD FOR EFFICIENT ROUTING ON A NETWORK IN THE PRESENCE OF MULTIPLE-EDGE RESTRICTIONS AND OTHER CONSTRAINTS

CROSS-REFERENCE TO RELATED APPLICATIONS

This application is a continuation-in-part application of U.S. application Ser. No. 12/633,481, titled SYSTEM AND METHOD FOR EFFICIENT ROUTING ON A NETWORK IN THE PRESENCE OF MULTIPLE-EDGE RESTRICTIONS AND OTHER CONSTRAINTS, and filed on Dec. 8, 2009, which claims the benefit to U.S. Provisional Application No. 61/121,891, titled SYSTEM AND METHOD FOR EFFICIENT ROUTING ON A NETWORK IN THE PRESENCE OF MULTIPLE-EDGE RESTRICTIONS AND OTHER CONSTRAINTS, and filed on Dec. 11, 2008. This application is a continuation-in-part application of U.S. application Ser. No. 12/954,547; titled VEHICLE ROUTE SELECTION BASED ON ENERGY USAGE, and filed on Nov. 24, 2010, which claims the benefit of U.S. Provisional Application No. 61/281,859, titled VEHICLE ROUTE OPTIMIZATION AND NAVIGATION USING LEAST ENERGY/FUEL, and filed on Nov. 24, 2009. The foregoing applications are hereby incorporated by reference herein in their entirety. This application also claims the benefit of U.S. Provisional Application No. 61/394,287, titled SCALABLE FLEET MANAGEMENT PLATFORM, and filed on Oct. 18, 2010.

BACKGROUND OF THE INVENTIONS

1. Field of the Inventions

Embodiments generally relate to systems and methods for solving the lowest cost and/or shortest path problem and, more specifically in some embodiments, to systems and methods for managing fleets of vehicles using routing techniques which include solving the lowest cost and/or shortest path problems on a graph or model of a road network with multi-edge constraints in a time and space efficient manner.

2. Description of the Related Art

The shortest path problem is the problem of finding a path between two nodes of a graph that minimizes the sum of the weights of the path's edges. A real-world example of the shortest path problem is navigating a city's streets.

For example, a driver might desire to get from one area of the city to another area of the city by driving the quickest route possible. The quickest route is determined by how far the driver must drive on each street in the city to get to the destination and how quickly the driver can drive on each of the streets, and then selecting the combination of streets in the city that minimize the amount of traveling time between the starting location and the destination. Depending on traffic, construction, road restrictions, etc., the quickest route can change considerably.

In the above example, the city's network of streets is modeled as a graph. The nodes of the graph are the starting location and destination of the driver and all intersections in the street network. The streets the driver could travel on during the trip are the edges of the graph. Each edge is also assigned a weight representing the amount of time the driver must spend traveling the street that corresponds to the edge.

Several techniques have been developed to solve the "shortest path problem". Dijkstra's algorithm can solve the shortest path problem, but only for a graph where the edge weights are independent of all previous edges. For example, continuing our driving example above, Dijkstra's algorithm cannot find the quickest route between two locations in a city where the city's network of streets has driving constraints based on which edge the driver has come from, such as no-left turns at certain intersections. The A* algorithm, which can also solve the shortest path program, is subject to the same limitations. Finally, while a simple breadth-first search with a priority queue can solve the shortest path problem, it is still subject to many of the same limitations. In particular, a breadth-first search will never allow a route where the same intersection must be visited twice. For example, if a left turn at an intersection is not allowed, the fastest route may be to go straight at the intersection, perform three right turns around a city block, and then go straight again at the same intersection.

SUMMARY OF THE INVENTION

Some of the embodiments disclosed herein can overcome these and other deficiencies of the prior art by providing a system and method that finds the quickest route between two locations on a graph with multi-edge constraints in a time and space efficient manner. In some embodiments, Dijkstra's algorithm is split into separate universes when a) a multiple-edge constraint is reached, and b) along each edge of a multi-edge constraint. In some embodiments, the split is performed for the purpose of finding the quickest (i.e. lowest weighted) route to the intersection(s) at the end of the constraints. These universes, in some embodiments, are merged or discarded when the intersection at the end of the constraint is found. Using these systems and methods, in some embodiments, the shortest path between two locations of a multi-edge constrained road network can be efficiently determined.

In one embodiment, a method for determining an optimal route between a starting node and a destination node in a graph is provided. The graph includes a plurality of nodes and a plurality of edges, wherein each edge connects two nodes in the graph and has a cost. The method includes accessing, using a computer system, the graph or model; determining, using the computer system, at least one route between the starting node and the destination node, where each route has an ordered set of the edges, and where an edge of a route connects a universe of a first node with a universe of a second node; determining, using the computer system, a cost for each of the at least one routes; and selecting, using the computer system, the route from the at least one route(s) with the lowest cost.

In some embodiments, the cost for a route is based on the cost for utilizing each edge of the route, and the cost for an edge of a route is based on the cost for utilizing the edge between the universes of the nodes to which the edge connects. In another embodiment, the method further includes assigning at least one universe to each node connected to an edge of a route, where a first universe is assigned to the starting node, and where a universe other than the first universe is assigned to a node when the node is a start or continuation of a multi-edge constraint. In some embodiments, the method further includes generating a signal, using the computer system, to facilitate following the selected route to the destination node. In some embodiments, the signal is made human perceivable. In some embodiments, the signal is transmitted to a second computer system over a network. In another embodiment, the second computer system generates a human perceivable signal based on the signal received over the network. In some embodiments, the edges represent streets, the nodes represent street intersections, the starting node represents a user's current location, and the destination node represents the user's desired destination. In some embodiments, the cost for a route is the amount of time needed to travel the route. In other embodiments, the cost for a route is the amount of money needed to travel the route. In yet another embodiment, the cost for a route is the total distance of the route. In some embodiments, the cost for a route is dynamic. In some embodiments, the cost for a route changes based on the time of day. In other embodiments, the cost for a route changes based on the type of vehicle used to travel the route.

In some embodiments, a computer readable medium having program instructions to determine an optimal route between a starting node and a destination node in a graph is provided. The graph has a plurality of nodes and a plurality of edges, where each edge connects two nodes in the graph and has a cost. The computer readable medium includes: program instructions for determining at least one route between the starting node and the destination node, each route having an ordered set of the edges, where an edge of a route connects a universe of a first node with a universe of a second node; program instructions for determining a cost for each of the at least one routes; and program instructions for selecting the route from the at least one routes with the lowest cost.

In some embodiments, the cost for a route is based on the cost for utilizing each edge of the route, where the cost for an edge of a route is based on the cost for utilizing the edge between the universes of the nodes the edge connects. In some embodiments, the computer readable medium further includes program instructions to assign at least one universe to each node connected to an edge of a route, where a first universe is assigned to the starting node, and where a universe other than the first universe is assigned to a node when the node is a start or continuation of a multi-edge constraint. In other embodiments, the computer readable medium further includes program instructions for causing a computer system to generate a signal to facilitate following the selected route to the destination node. In some embodiments, the signal is human perceivable. In some embodiments, the computer readable medium further includes program instructions for transmitting the signal to a second computer system over a network. In some embodiments, the second computer system generates a human perceivable signal based on the signal received over the network. In some embodiments, the edges represent streets, the nodes represent street intersections, the starting node represents a user's current location, and the destination node represents the user's desired destination. In some embodiments, the cost for a route is the amount of time needed to travel the route. In other embodiments, the cost for a route is the amount of money needed to travel the route. In another embodiment, the cost for a route is the total distance of the route. In some embodiments, the cost for a route changes, based on the time of day. In some embodiments, the cost for a route changes based on the type of vehicle used to travel the route.

In some embodiments, a computer-implemented method of vehicle routing optimization by using a multivariate function for calculating a route value, the vehicle routing optimization configured to determine an optimal driving route for a driver of a vehicle traveling between a starting geographical location and a destination geographical location, the computer-implemented method comprises: accessing the starting geographical location of the vehicle; accessing the destination geographical location of the vehicle; accessing a model from an electronic storage, the model representing a road network comprising the starting geographical location and the destination geographical location, the model comprising a plurality of nodes representing intersections of the road network and a plurality of edges representing roadways of the road network, wherein each edge connects at least two nodes in the model and has a cost value for the vehicle to travel along the roadway represented by the edge; determining at least one driving route for the vehicle traveling between the starting geographical location of the vehicle and the destination geographical location of the vehicle, each driving route comprising an ordered set of edges, wherein each edge comprises a multivariate cost function for determining the cost value for the vehicle to travel along the roadway represented by the edge; determining the route value for each of the at least one driving routes based on the cost values for each edge in the at least one driving routes; and selecting the driving route from the at least one driving routes with the lowest route value; wherein the computer-implemented method is performed by a computer system that comprises one or more computing devices; wherein each multivariate cost functions comprises variables, the variables comprising at least a mapping data variable and at least one of the following variables: vehicle characteristic data variable, environmental data variable, driver data variable, and post intersection variable data.

In an embodiment, a non-transitory storage medium having a computer program stored thereon for causing a suitably programmed system to process computer-program code by performing a method of vehicle routing optimization by using a multivariate function for calculating a route value, the vehicle routing optimization configured to determine an optimal driving route for a driver of a vehicle traveling between a starting geographical location and a destination geographical location, the method comprises: accessing the starting geographical location of the vehicle; accessing the destination geographical location of the vehicle; accessing a model from an electronic storage, the model representing a road network comprising the starting geographical location and the destination geographical location, the model comprising a plurality of nodes representing intersections of the road network and a plurality of edges representing roadways of the road network, wherein each edge connects at least two nodes in the model and has a cost value for the vehicle to travel along the roadway represented by the edge; determining at least one driving route for the vehicle traveling between the starting geographical location of the vehicle and the destination geographical location of the vehicle, each driving route comprising an ordered set of edges, wherein each edge comprises a multivariate cost function for determining the cost value for the vehicle to travel along the roadway represented by the edge; determining the route value for each of the at least one driving routes based on the cost values for each edge in the at least one driving routes; and selecting the driving route from the at least one driving routes with the lowest route value; wherein the method is performed by a computer system that comprises one or more computing devices; wherein each multivariate cost functions comprises variables, the variables comprising at least a mapping data variable and at least one of the following variables: vehicle characteristic data variable, environmental data variable, driver data variable, and post intersection variable data.

In an embodiment, a computer system for vehicle routing optimization by using a multivariate function for calculating a route value, the vehicle routing optimization configured to determine an optimal driving route for a driver of a vehicle traveling between a starting geographical location and a destination geographical location, the method comprises: a start location module configured to access the starting geographical location of the vehicle; a destination location module configured to access the destination geographical location of the vehicle; a data access module configured to access a model from an electronic storage, the model representing a road network comprising the starting geographical location and the destination geographical location, the model comprising a plurality of nodes representing intersections of the road network and a plurality of edges representing roadways of the road network, wherein each edge connects at least two nodes in the model and has a cost value for the vehicle to travel along the roadway represented by the edge; a route determination module configured to determine at least one driving route for the vehicle traveling between the starting geographical location of the vehicle and the destination geographical location of the vehicle, each driving route comprising an ordered set of edges, wherein each edge comprises a multivariate cost function for determining the cost value for the vehicle to travel along the roadway represented by the edge; a route value module configured to determine the route value for each of the at least one driving routes based on the cost values for each edge in the at least one driving routes; and a route selection module configured to select the driving route from the at least one driving routes with the lowest route value; wherein the computer system comprises one or more computing devices; wherein each multivariate cost functions comprises variables, the variables comprising at least a mapping data variable and at least one of the following variables: vehicle characteristic data variable, environmental data variable, driver data variable, and post intersection variable data.

The foregoing, and other features and advantages of embodiments will be apparent from the following, more particular description of the preferred embodiments and the accompanying drawings.

BRIEF DESCRIPTION OF THE DRAWINGS

For a more complete understanding of embodiments, the objects and advantages thereof, reference is now made to the following descriptions taken in connection with the accompanying drawings in which:

FIG. 2 depicts the contents of a data structure upon insertion of the initial node into the data structure, according to an embodiment.

DETAILED DESCRIPTION OF THE PREFERRED EMBODIMENT

Figure 1:
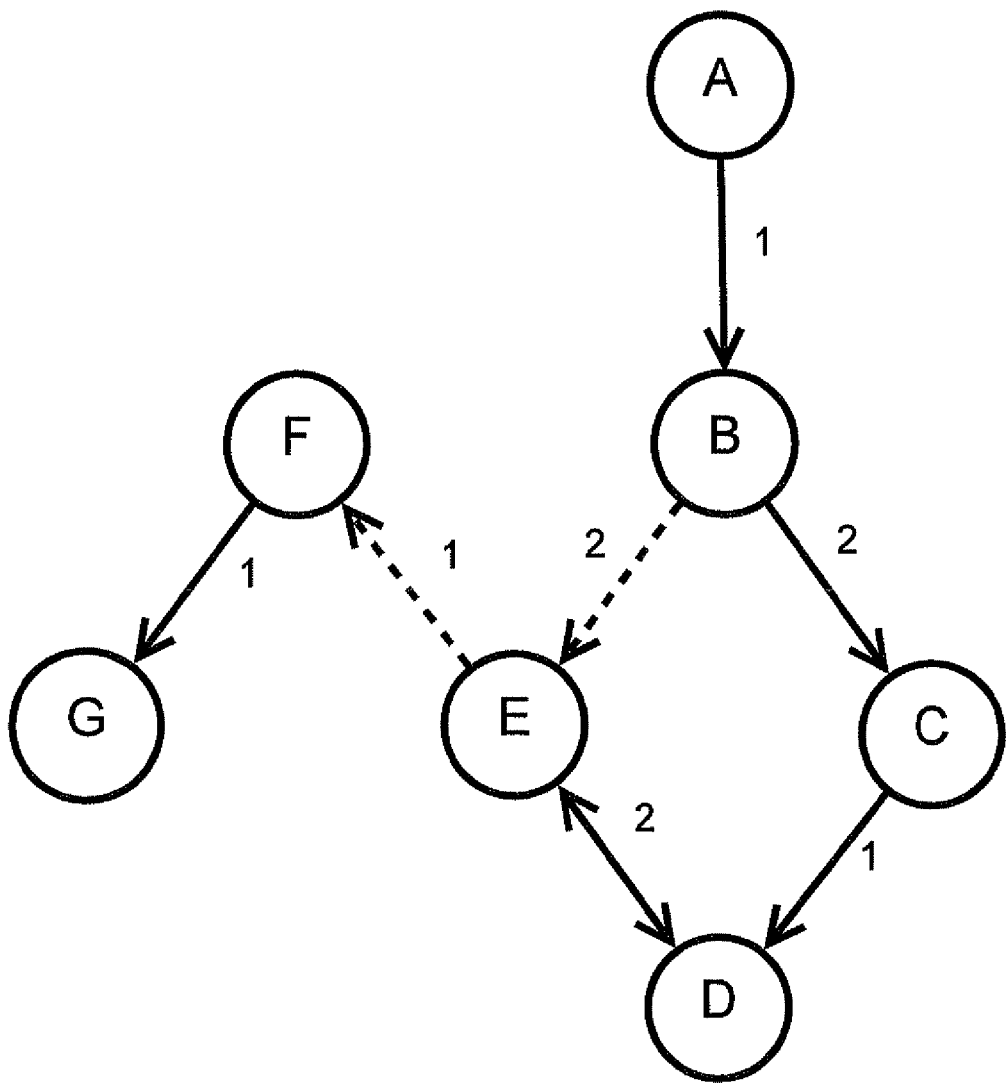
FIG. 1 depicts a simplified abstraction of a road network according to an embodiment.

Route scheduling or route selection for a fleet of vehicles is often a complex and multivariable challenge for fleet managers and/or companies. For example, a package delivery company can comprise a fleet of trucks for delivering various packages to various destinations across a road network of various roadways. The challenge for a package delivery company is how to deliver all the various packages to the various destinations by utilizing a specific set of drivers and a particular set of vehicles in such a way that the least cost value option is utilized for delivering the package.

The terms "cost value" or "composite cost" as used herein are broad interchangeable terms and can mean and/or refer to a value that accounts for a variety of cost factors, for example, energy cost, distance cost, time cost, monetary cost, and other cost factors, for utilizing a particular roadway or route. In an embodiment, the cost value is a normalized value and/or a composite of a plurality of variables. In general, it can be difficult to calculate the least cost value option because of the number of variables involved in such a calculation. Further, each of the possible variables can have different units of measure. In order to utilize such variables in calculating a cost value of a particular route, it can be advantageous to normalize the dimension of a variable in order to account for the variable's contribution in calculating the cost value of a particular roadway or route.

To add to the complexity of calculating a cost value of a route, in general there are multiple roadway options to reaching a particular destination geographical location from a particular geographical starting point. Each roadway option can have a cost value associated with utilizing the particular roadway. To determine the cost value associated with the roadway, the roadway can be associated with a particular cost function. The cost function can be a multi-variate cost function that takes into account a plurality of variables. In general, the values can be both real and/or logical valued variables. Possible variables include but are not limited to time of duration to traverse the particular roadway, speed allowed to traverse the particular roadway, the amount of energy needed for traversing a particular roadway, traffic congestion, as well as other factors disclosed herein. Accordingly, there is a need for a route optimization system that can generate cost values for various roadway options by utilizing and analyzing the cost functions associated with roadway options.

Additionally, route optimization is further made complicated by the existence of multi-edge constraints in a particular road network. A multi-edge constraint occurs when there is a restriction on the use of a particular roadway, wherein the restriction is dependent upon one or more other roadways. For example, a multi-edge constraint can comprise a no left turn restriction because there is a restriction on entering a second roadway when attempting to make a left hand turn from a first roadway. To account for such multi-edge constraints in selecting an optimized route, multi-edge constraints can be accounted for when calculating a cost value for utilizing a particular roadway. In accounting for multi-edge constraints in a cost value, the multi-edge constraint variable can be normalized in order for the multi-edge constraint variable to be utilized in a cost function.

To calculate cost values for particular roadways or total cost values for particular routes, a route optimization system can be configured to calculate in advance all cost values and store the pre-calculated cost values in a look-up table or other database. However, it can be advantageous to calculate cost values on a real time basis. For example, many mobile devices do not possess the storage capacity to store a large volume of cost values in memory. Such mobile devices however can possess processors with sufficient processing power to calculate cost values on a real time basis. Additionally, the variables for inputting into cost functions that generate cost values generally change periodically. Example variables that change periodically include but are not limited to traffic conditions, weather conditions, driver characteristics, and other variables as described herein.

In view of the foregoing challenges and advantages, there is disclosed herein a route optimization system configured to identify and/or select route options having an optimal or a lowest cost value. The route optimization system can be configured to calculate cost values by analyzing cost functions associated with particular roadways of a route option. In calculating cost values, the route optimization system can be configured to input relevant factor data or variables into a cost function associated with a particular roadway. In certain embodiments, the route optimization system can be configured to normalize the factor variables before inputting the factor variables into a cost function to produce a cost value.

To account for multi-edge restrictions in the cost value for a particular roadway, the route optimization system can be configured to input multi-edge constraint variables into a cost function as a post-intersection factor variable as such are described herein. In an embodiment, the route optimization system can be configured to calculate an optimal or lowest cost value route option in real time by analyzing the cost value of each roadway option that is available for reaching a particular destination. In any embodiment, the route optimization system can be configured to simplify the route optimization calculations by breaking down the roadway options into specific universes as disclosed herein.

Utilizing the various foregoing route optimization features, a route optimization system can be configured to receive a listing of available drivers, a listing of available vehicles for use, a listing of destinations to reach in a particular period, and a set of data factors or variables to account for in determining optimal route calculations. As a possible output, the route optimization system can be configured to generate a listing or assign particular drivers to particular vehicles for driving to particular destinations using a specified route, wherein the combination represents an optimal or lowest cost value route option.

Further features and advantages of embodiments, as well as the structure and operation of various embodiments, are described in detail below with reference to the accompanying FIGS. 1-22. The embodiments are described in the context of a road network, wherein letters indicate intersections, arrows indicate street direction, numerals indicate the cost of traversing the street, and dotted lines indicate streets with some restrictions placed on them. Nonetheless, one of ordinary skill in the art readily recognizes that embodiments are applicable in numerous fields and contexts which require efficient routing or travel between two nodes on a graph, such as data routing, package routing, video game play, etc.

Referring now to FIG. 1, depicted is a simplified abstraction of a road network according to an embodiment. Each street between intersections A, B, C, D, E, F, and G has a cost associated with it. These are the costs for utilizing the edges in the graph, and, in some embodiments, reflect a relationship between the nodes. For example, in some embodiments, the costs reflect the distance between intersections in a road network, or the time to travel between the intersections. The costs need not be reflective of time. For example, in some embodiments, costs reflect a monetary price for traveling between nodes, such as traveling via a toll road. In some embodiments, the costs for utilizing edges are dynamic. For instance, the costs for traveling between intersections in a road network may increase during rush hour, or may vary based on the type of vehicle being driven. Thus, for example, a specific street may be restricted to passenger cars only. In this example, a semi-truck would be prohibited from traveling on the street and the street's cost would, in some embodiments, be infinite. In some embodiments, edges may only be utilized in one direction. For example, the streets depicted in FIG. 1 have a direction of travel, indicated by the arrows. Thus, the street between intersection B and intersection E is one-way, and one could not travel from intersection E to intersection B directly. In some embodiments, an edge's directionality is dynamic. For instance, a street may be one-way into a city during morning rush hour, permit two-way travel into and out of the city during midday, and be one-way out of the city during evening rush hour. One of ordinary skill in the art will recognize that, in some embodiments, a two-way street is equivalent to two one-way streets, and thus numerous different options and constraints can be applied to simply one direction of travel on a two-way street.

The road network of FIG. 1 also comprises a multi-edge constraint B→E→F. That is, the street between intersections E and F cannot be traveled if the path through the road network would include B→E→F. As depicted, such multi-edge constraints may represent the prohibition of a right turn at intersection E. According to some embodiments, multi-edge constraints are modeled by dynamically increasing the cost of the edge E→F (to, potentially, infinite, if the real-life maneuver is impossible) if coming from intersection B. As discussed above, multi-edge constraints, in the context of a road network, typically represent no u-turns, or no-left/no-right turns. In contrast, single-edge constraints indicate a restriction that is independent of any other link, such as a height restriction. The lowest cost path from intersection A to intersection F is: A→B→C→D→E→F, with a total cost of 7. An alternative path, A→B→E→F, has an apparent total cost of 5, but contains the multi-edge constraint B→E→F and therefore is not allowed (that is, in some embodiments, it has an actual cost of infinity). According to an embodiment, the optimal path is determined by the following process.

In some embodiments, the first step for determining the optimal path is to specify the current location within the graph or model and the destination within the graph or model. For example, referring to FIG. 1, if a driver is currently located at intersection A, and desires to travel to intersection G, these two intersections must first be specified. In some embodiments, the current location is determined automatically using GPS (global positioning system) or similar technology. In other embodiments, a user of the system manually inputs the current location. In some embodiments, the current and destination locations are included in a data structure for future reference, discussed in more detail below. In some embodiments, the current node, here intersection A, is then included in a first universe representing a possible path towards the destination node, here intersection G. Because the presence of a multi-edge constraint may require an intermediate intersection to be reached by a non-shortest path, in some embodiments, new universes are spawned at intersections along constraints to allow intersections to appear in multiple universes. For instance, the shortest distance from A to E is A→B→E, but the shortest distance to F is A→B→C→D→E→F. Multiple universes allow intersection E to exist in both, and not be discarded at A→B→C→D→E even though a shorter path (A→B→E) has already been found.

After including the current node in a universe, the current node, here intersection A, is inserted into a data structure for analysis. In some embodiments, a heap is used to implement a priority queue of nodes ordered by the least-cost appearance (i.e. the lowest cost universe) of each node. In other embodiments, data structures other than a heap are used. As one of ordinary skill in the art will recognize, in some embodiments, any type of data structure can be used so long as the following functions (or similar functions) are operable on the data structure:

Node* DeleteMin( )

If the minimum node has only one appearance (i.e. is in only one universe), then it is removed from the data structure.

If the minimum node has more than one appearance (i.e. is in more than one universe), then the minimum node is marked as not in the data structure.

Decrease(Node* value)

If either a) a new universe has been added that has a lower cost than an existing universe, or b) the cost of an existing universe has been reduced, then this function is used to preserve the data structure order.

Insert(Node* value)

If the node is not in the data structure then the node is inserted.

In addition, those of ordinary skill in the art will recognize that concepts aside from traditional data structures can be used to implement embodiments according to similar techniques, and that the use of a traditional data structure, and the specific methods for manipulating the data structures disclosed, are not necessary for implementing all embodiments and are, in some embodiments, for illustrative purposes only. Referring now to FIG. 2, depicted are the contents of the data structure upon insertion of the current node, intersection A, into the data structure, according to some embodiments. As is apparent, the data structure comprises intersection A, and intersection A appears in the first universe.

Figure 3:
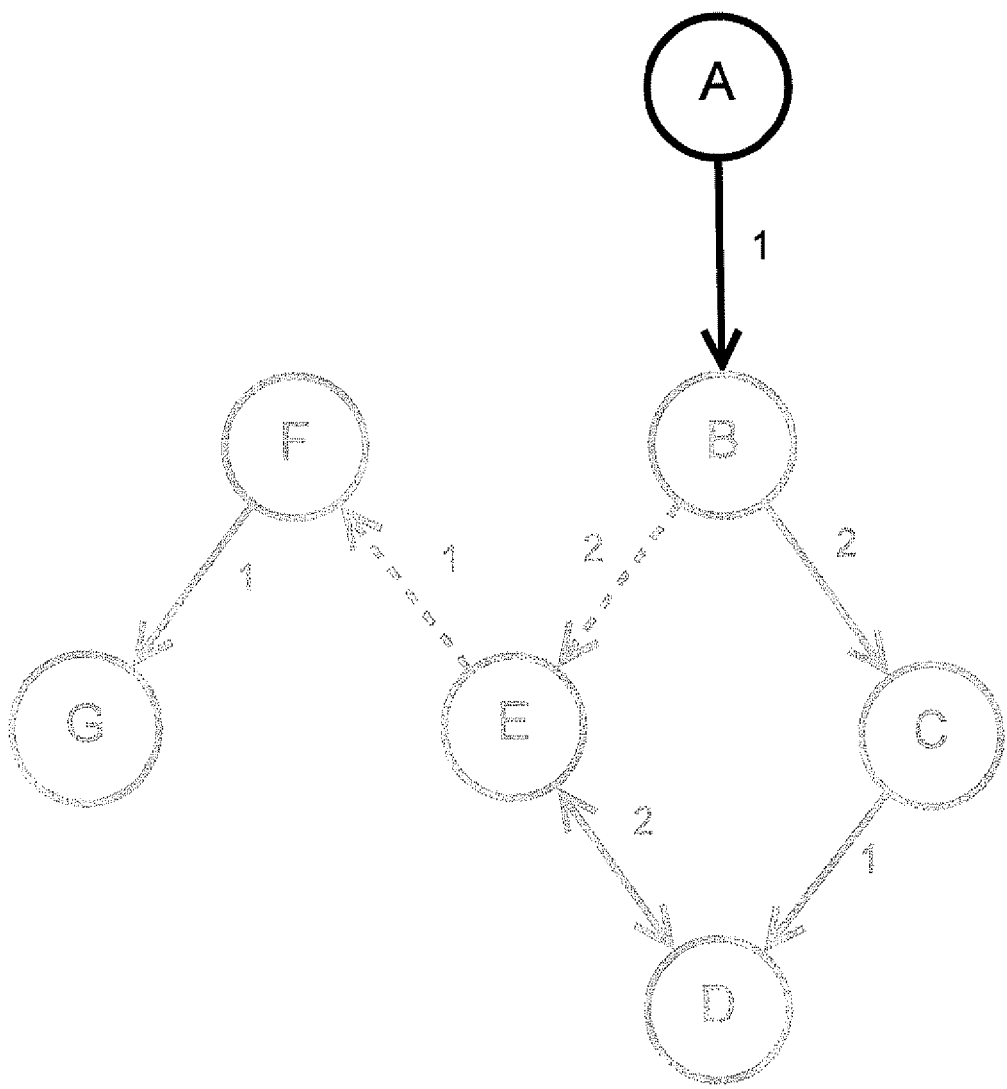
FIG. 3 illustrates a first iteration of an embodiment as applied to intersection A.

Next, in some embodiments, the node corresponding to the current location, which is the only node in the data structure and thus the node in the data structure with the lowest cost, is analyzed. For example, referring now to FIG. 3, illustrated is a first iteration of an embodiment as applied to intersection A. If a driver is located at intersection A, intersection A is removed from the priority queue portion of the data structure and operated on first. In some embodiments, the edges connected to the current node and their costs are determined. Thus, the street between A and B is identified and its cost, 1, is noted. If there are multiple single-edge constraints for traveling between nodes on a single edge then, in some embodiments, the highest applicable cost is used. For instance, if the typical travel cost between intersections A and B on a given street is 1, but only cars are permitted on the street, resulting in a high or infinite cost to buses, then if a car is driving on the street the cost will be 1, but if a bus is driving on the street the higher or infinite cost is used.

In some embodiments, the nodes connected to the current node via an edge appear in a universe. Thus, intersection B appears in a universe. In some embodiments, if a) the current universe of the node comprises a multi-edge constraint and the universe still has targets; or b) if any of the edges connected to the current node are the start of a multi-edge constraint and the connected node has not been seen in the universe of the current node, then each node connected to the current node appears in a new universe and each universe is assigned one or more targets. Otherwise, in some embodiments, all the nodes connected to the current node appear in the current universe of the current node. For example, in this case since the first universe of intersection A does not currently comprise a multi-edge constraint, and since the street between intersections A and B is not the start of a multi-edge constraint, intersection B also appears in the current universe of intersection A, the first universe. Targets, in some embodiments, correspond to the final node of the multi-edge constraint. In some embodiments, the targets or information related thereto is included in a data structure for future reference.

For each node the current node is directly connected to, in some embodiments, the total cost for traveling to the node for a given universe is determined. Still referring to FIG. 3, since there was no cost to travel to intersection A as a part of the first universe, and a cost of 1 to travel from intersection A to intersection B, the total cost to travel to intersection B in the first universe is 1.

In some embodiments, each node connected to the current node is given a route. A route indicates the node and universe from which each node came. For instance, intersection B appears in the first universe, and came from the intersection A which also appears in the first universe, therefore, the route of the intersection B in the first universe is the intersection A in the first universe. Those of ordinary skill in the art will recognize that a route is simply a means for identifying a specific path and its cost, and that numerous methods for determining the route of a path are possible.

Figure 4:
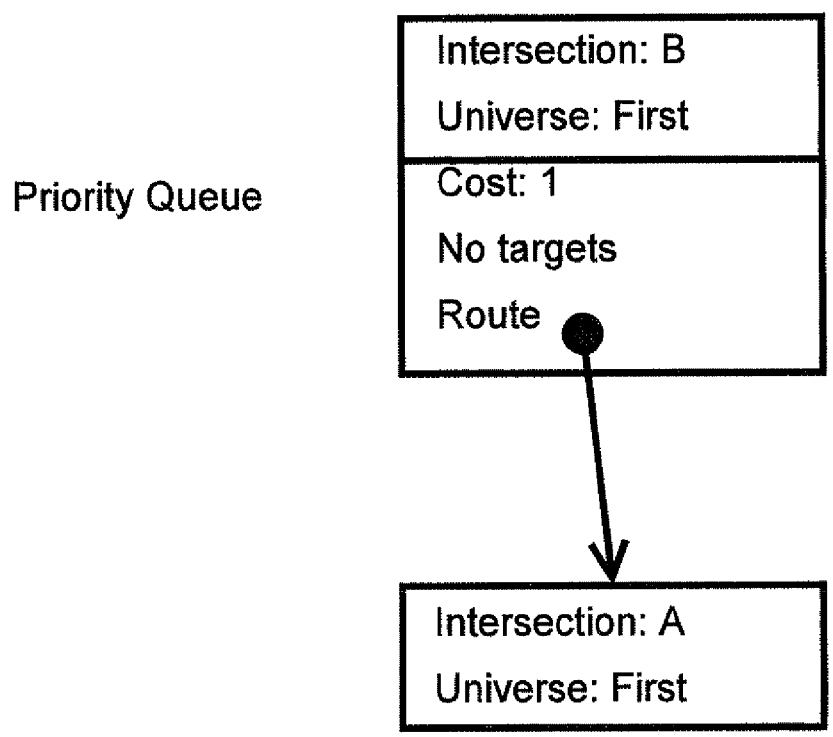
FIG. 4 depicts the contents of a data structure after the insertion of intersection B, according to an embodiment.

Finally, in some embodiments, each node connected to the current node is inserted into the priority queue data structure for future analysis. For example, intersection B is inserted into the priority queue data structure. Referring now to FIG. 4, depicted are the contents of the data structure and the operations performed on intersection A upon completion of the first iteration, according to an embodiment. As is apparent, intersection A is no longer a part of the priority queue data structure, while intersection B has been inserted into the priority queue data structure. Intersection B appears in the first universe, and the appearance is given a cost, and given a route to the part in the data structure representing the node from which it came, in this case intersection A in the first universe. Note that intersection A, while it no longer exists in the priority queue part of the data structure, does still exist in the data structure in order for routes from A to be able to be determined when necessary.

In some embodiments, the process discussed above with reference to FIG. 3 and FIG. 4 is generally repeated until the shortest path to the destination node is determined. Speaking generally, in some embodiments, the process proceeds by:

(a) selecting the node in the priority queue data structure with the lowest cost and marking the selected node as the current node;

(b) removing the current node from the priority queue data structure;

(c) determining the edges connected to the current node and their costs;

(d) determining whether the nodes connected to the current node should appear in the same universe is the current node, or whether a new universe should be created for each connected node to appear in;

(e) determining the total cost for traveling to each node connected to the current node for a given universe;

(f) specifying a route for each node connected to the current node; and (g) inserting each of the new nodes into to the priority queue data structure for future analysis.

Figure 5:
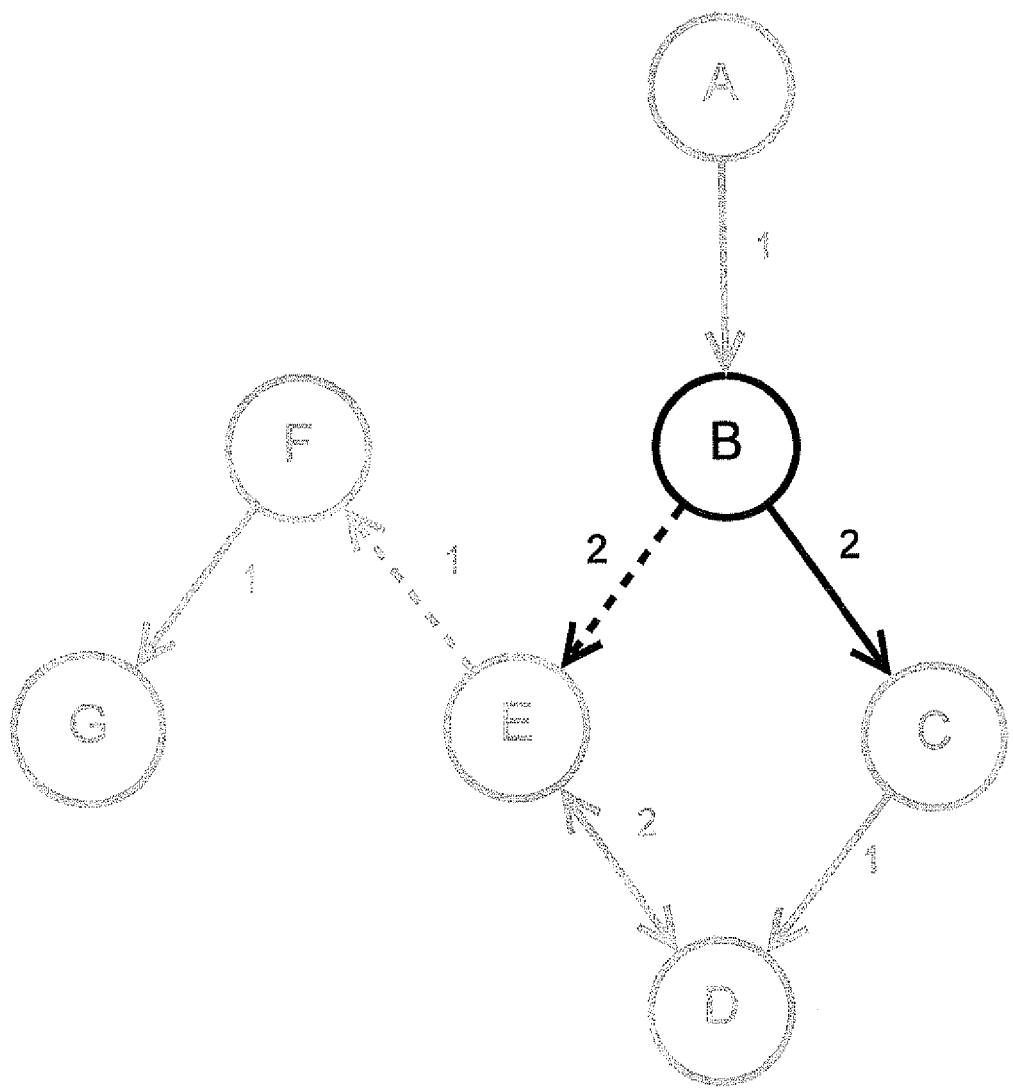
FIG. 5 illustrates an iteration of an embodiment as applied to intersection B.

Referring now to FIG. 5, illustrated is an iteration of an embodiment as applied to intersection B. Continuing from the prior example, since only intersection B is in the priority queue data structure, it is removed and operated on. The costs for traveling from intersection B to intersections C and E are determined, both of which are 2. In this case, since the street between intersections B and E is the start of a multi-edge constraint (B→E→F), new universes are created for each of intersections C and E to appear in. Intersection C is added to a second universe and intersection E is added to a third universe.

Figure 6:
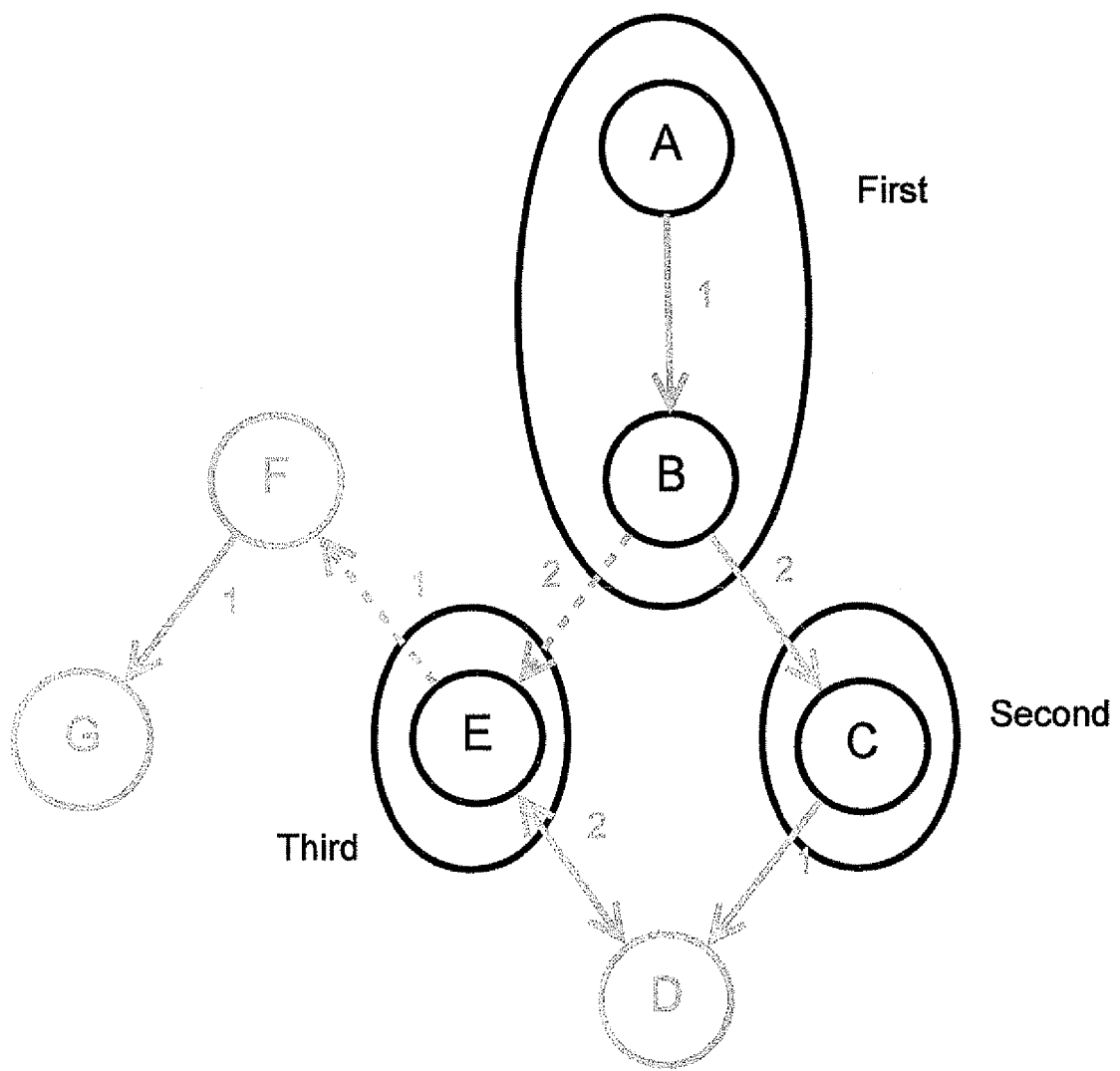
FIG. 6 illustrates which nodes of the road network appear in which universes after inserting intersections C and E, according to an embodiment.

Referring now to FIG. 6, illustrated are the universes of the road network after adding intersections C and E, according to an embodiment. The universes created for intersections C and E are also assigned a target corresponding to the final node of the multi-edge constraint. Thus, the universes of intersections C and E are assigned as a target intersection F.

Referring back to FIG. 5, the cost for intersections C and E is now determined, which is the sum of the cost to get to intersection B, which was 1, and the cost to get from intersection B to intersections C and E, respectively, Thus, the cost for intersection C is 3, and the cost to get to intersection E is also 3. The appearances of intersections C and E are then given routes, here the appearance of B in the first universe. Finally, the appearances of intersections C and E are inserted into the data structure for future analysis.

Figure 7:
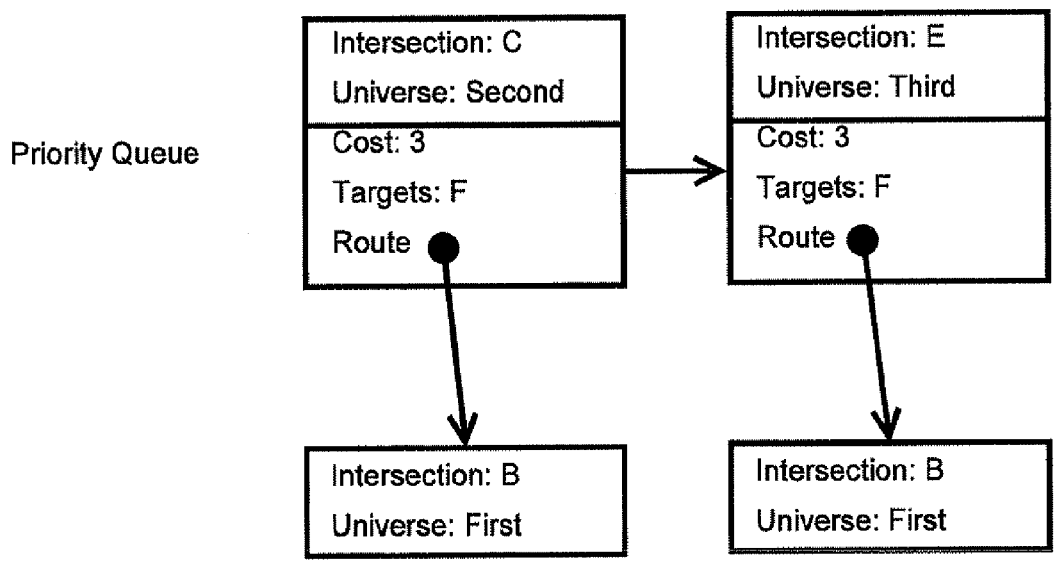
FIG. 7 depicts contents of a data structure following the iteration in FIG. 5, according to an embodiment.

Referring now to FIG. 7, depicted are the contents of the data structure upon completion of an additional iteration, according to an embodiment. Intersection B is no longer a part of the priority queue data structure, while appearances of intersections C and E have been inserted into the data structure. Intersections C and E have each appeared in a separate universe, and those appearances have been given a cost and a route, As the priority queue is, in some embodiments, ordered by cost, and the appearances of C and E both have a cost of 3, the order of C and E in the priority queue is arbitrary. In this example, C is before E in the priority queue, but this ordering is not required; it could equally be E before C.

Figure 8:
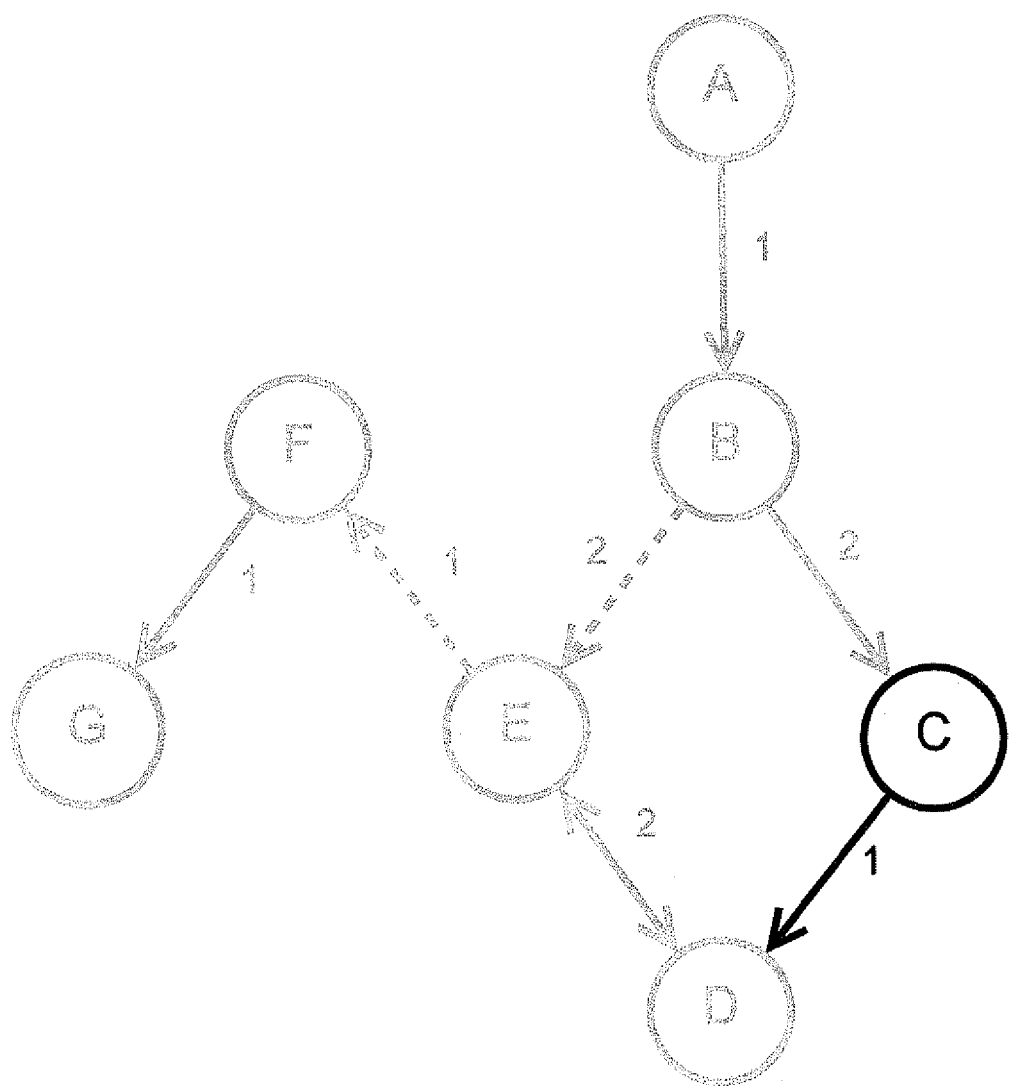
FIG. 8 illustrates an iteration of an embodiment as applied to intersection C.
Figure 9:
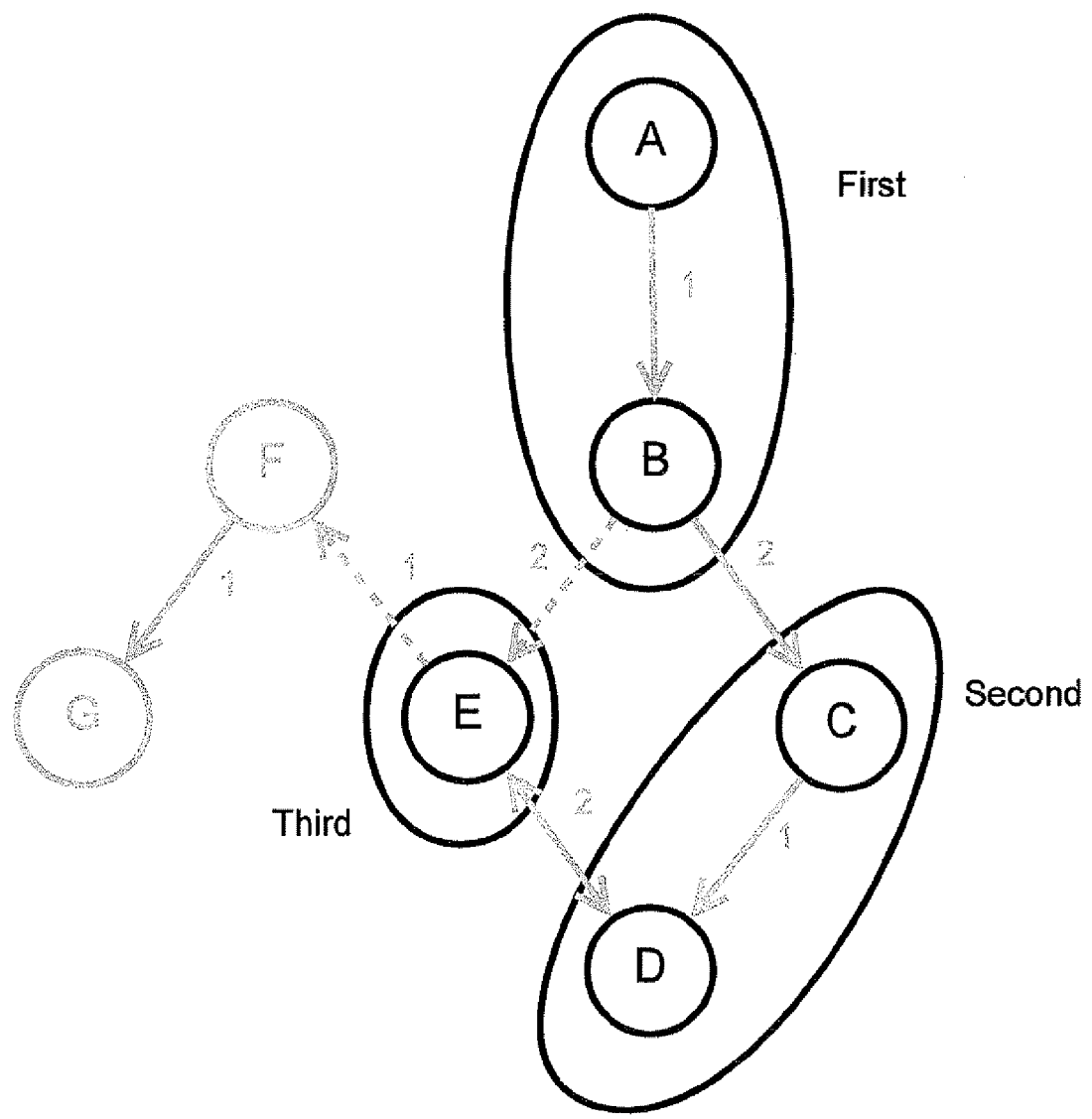
FIG. 9 depicts the universes of the road network after inserting intersection D into the second universe, according to an embodiment.

Referring now to FIG. 8, illustrated is an iteration of an embodiment as applied to intersection C, as the appearance of intersection C is at the front of the priority queue. The cost for traveling from intersection C to intersection D is determined, which is 1. Intersection D appears in the same universe (the second universe) as intersection C, because C is not on a multi-edge constraint. Referring now to FIG. 9, depicted are the universes of the road network after the appearance of intersection D in the second universe, according to an embodiment. The appearance of intersection D is then given a route to the appearance of intersection C in the same universe. The cost for the second universe of intersection D is determined, which is 4 (equivalent to the cost of traveling from A→B→C→D). Finally, intersection D is inserted into the data structure for future analysis.

Figure 10:
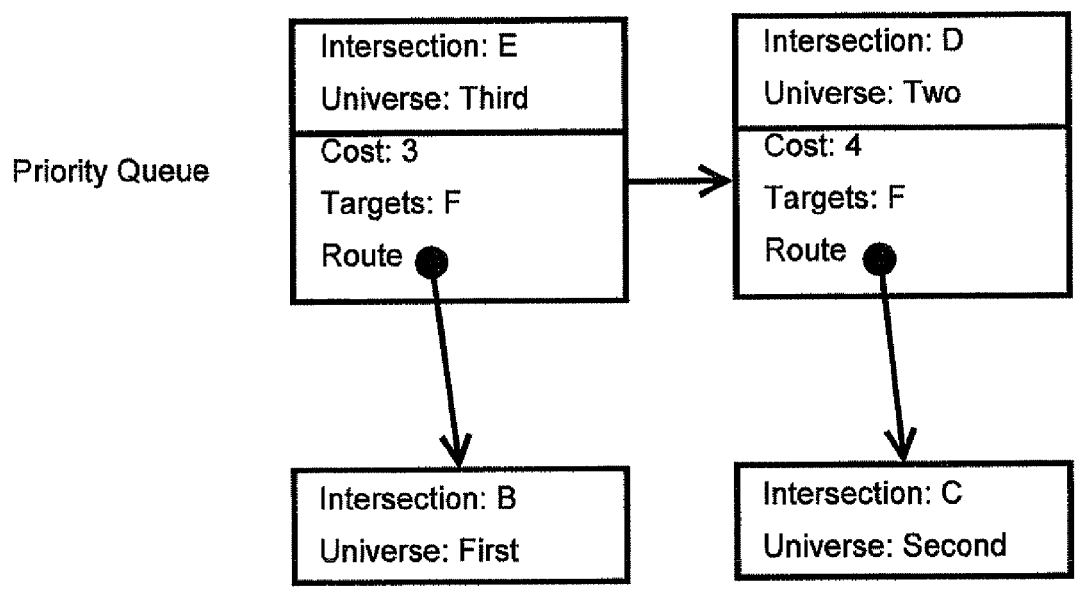
FIG. 10 depicts the contents of a data structure following FIG. 8, according to an embodiment.

Referring now to FIG. 10, depicted are the contents of the data structure, according to an embodiment. The appearance of Intersection C is no longer a part of the data structure, while the appearance of intersection D has been inserted into the data structure. In some embodiments, since the cost of intersection D is higher than the cost of intersection E, intersection E is at the front of the priority queue data structure to be operated on next.

Figure 11:
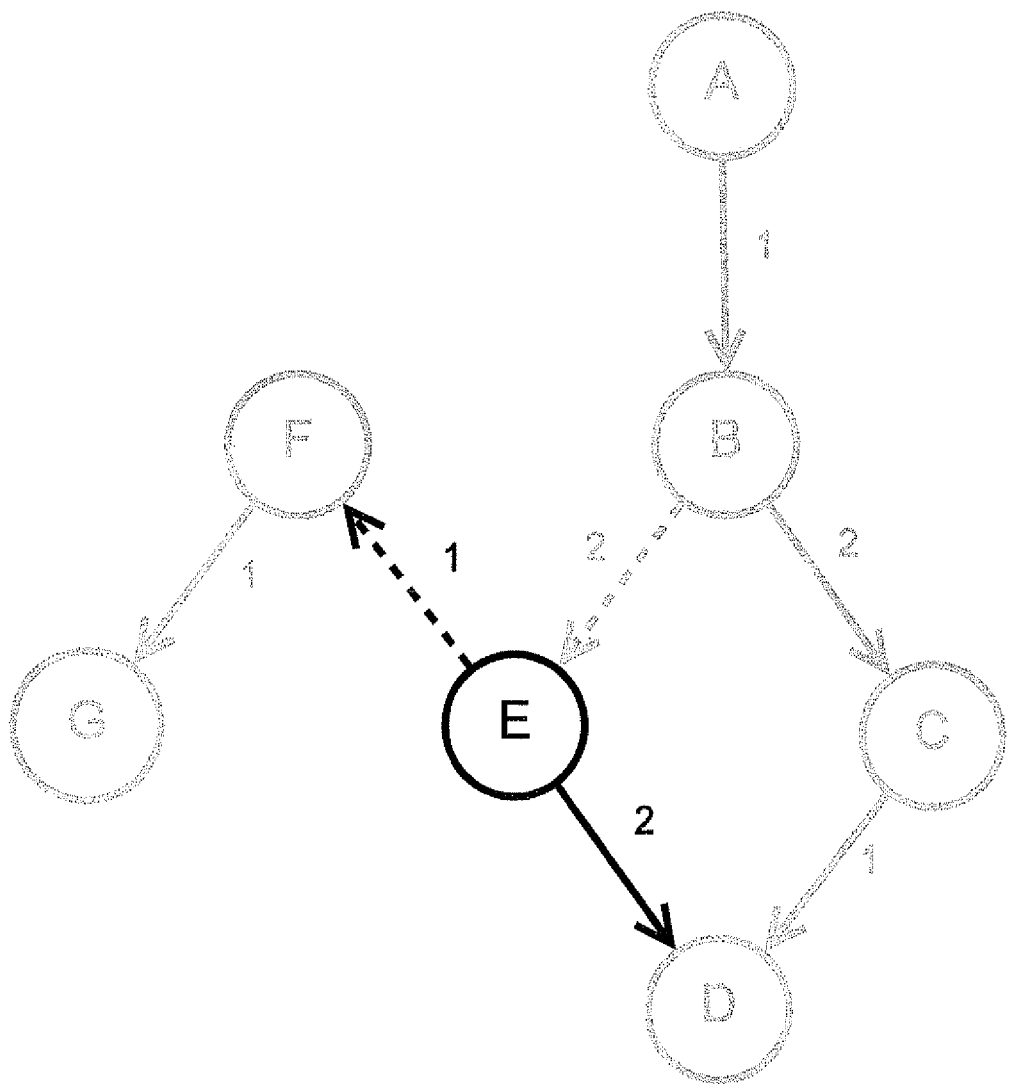
FIG. 11 illustrates an iteration of an embodiment as applied to the appearance of E in the third universe.

Referring now to FIG. 11, illustrated is an iteration of an embodiment as applied to the appearance of intersection E in third universe. Since the appearance of intersection E has a cost of 3, while the appearance of intersection D has a cost of 4, the appearance of intersection E is selected to be removed from the priority queue data structure and operated on. The cost for traveling from intersection E to intersections D and F is determined. The cost for traveling from intersection E to intersection D, 1, is easily found, but the cost between intersections E and F in this case is not as straightforward. As discussed above, the street to intersection F from intersection E, when part of the path B→E→F, is constrained. Such constraint, for example, represents a "no right turn" at intersection E. In some embodiments, the cost of travel between intersections E and F in the third universe is therefore infinite, meaning the path will never be the shortest path and will not be taken. Nevertheless, in some embodiments, the appearance of F will be added to the priority queue data structure.

Figure 12:
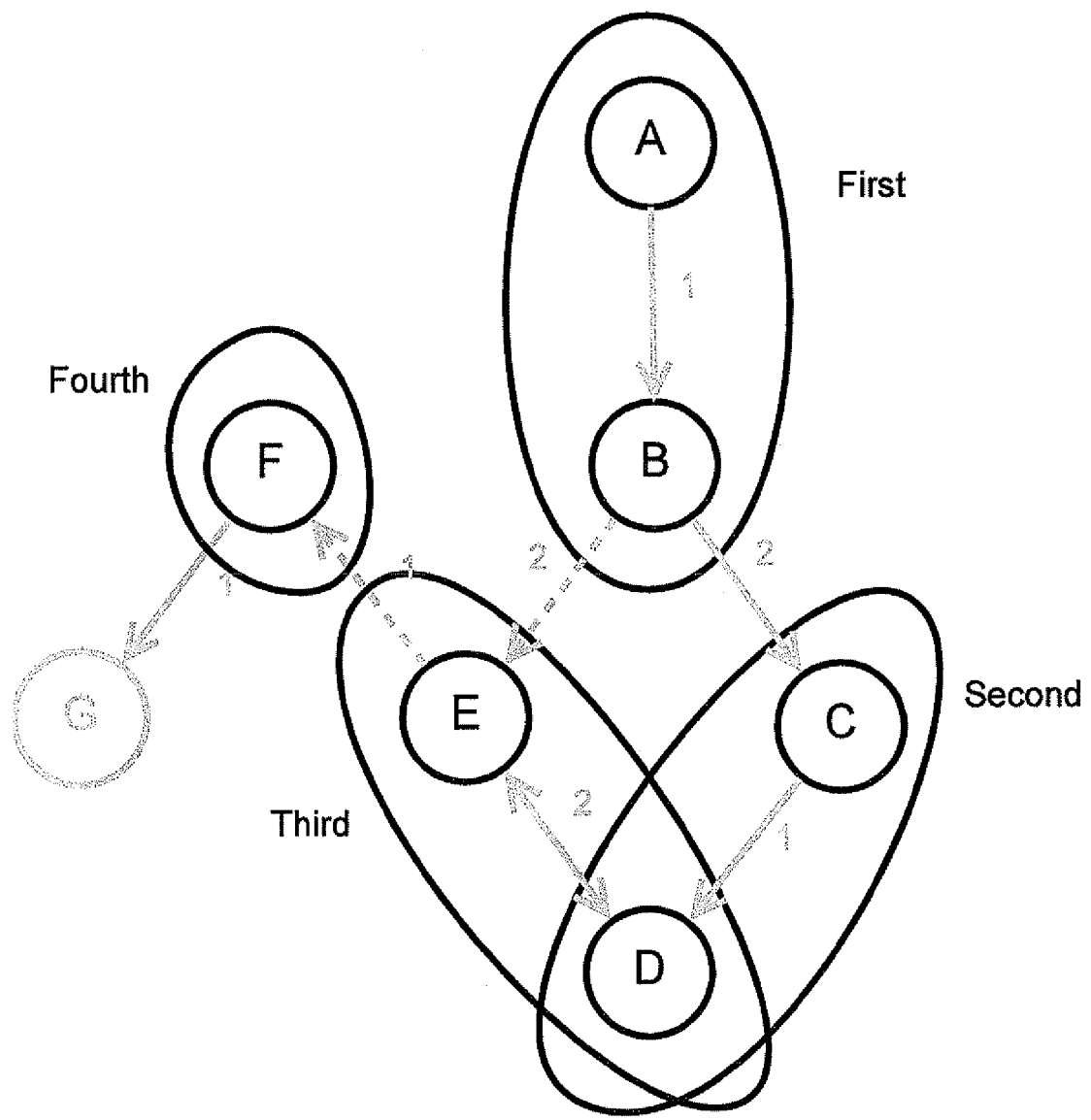
FIG. 12 depicts the universes after the iteration in FIG. 11 according to an embodiment.

Referring now to FIG. 12, intersection F appears in a new universe, universe four, because F is on a multi-edge constraint.

Figure 13:
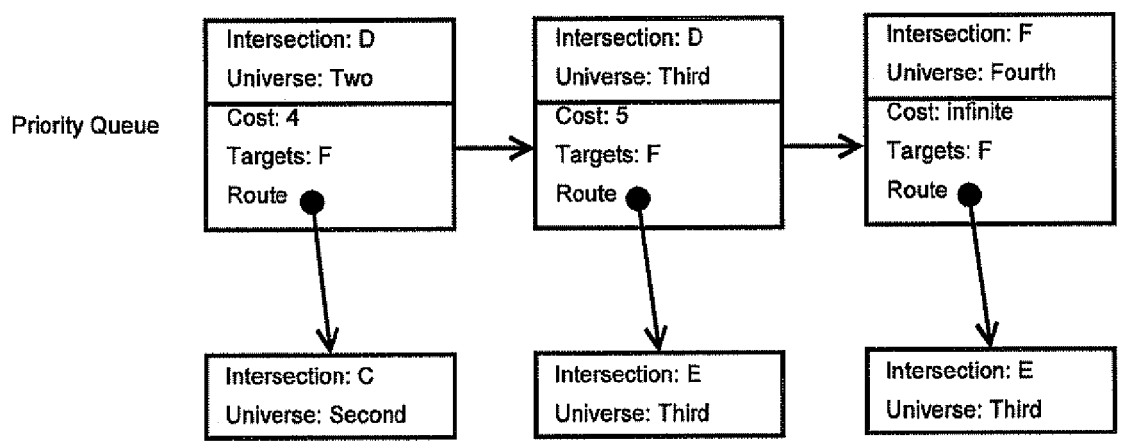
FIG. 13 depicts the contents of a data structure after FIG. 11, according to an embodiment.

Referring now to FIG. 13, the priority queue data structure has intersection D appearing twice. The first appearance of D is in universe two, with a cost of 4, and a route coming from Intersection C which also appears in universe two. This corresponds to the path A→B→C→D. The second appearance of D is in universe three, with a cost of 5, and a route coming from Intersection E which also appears in universe three. This corresponds to the path A→B→E→D.

Figure 14:
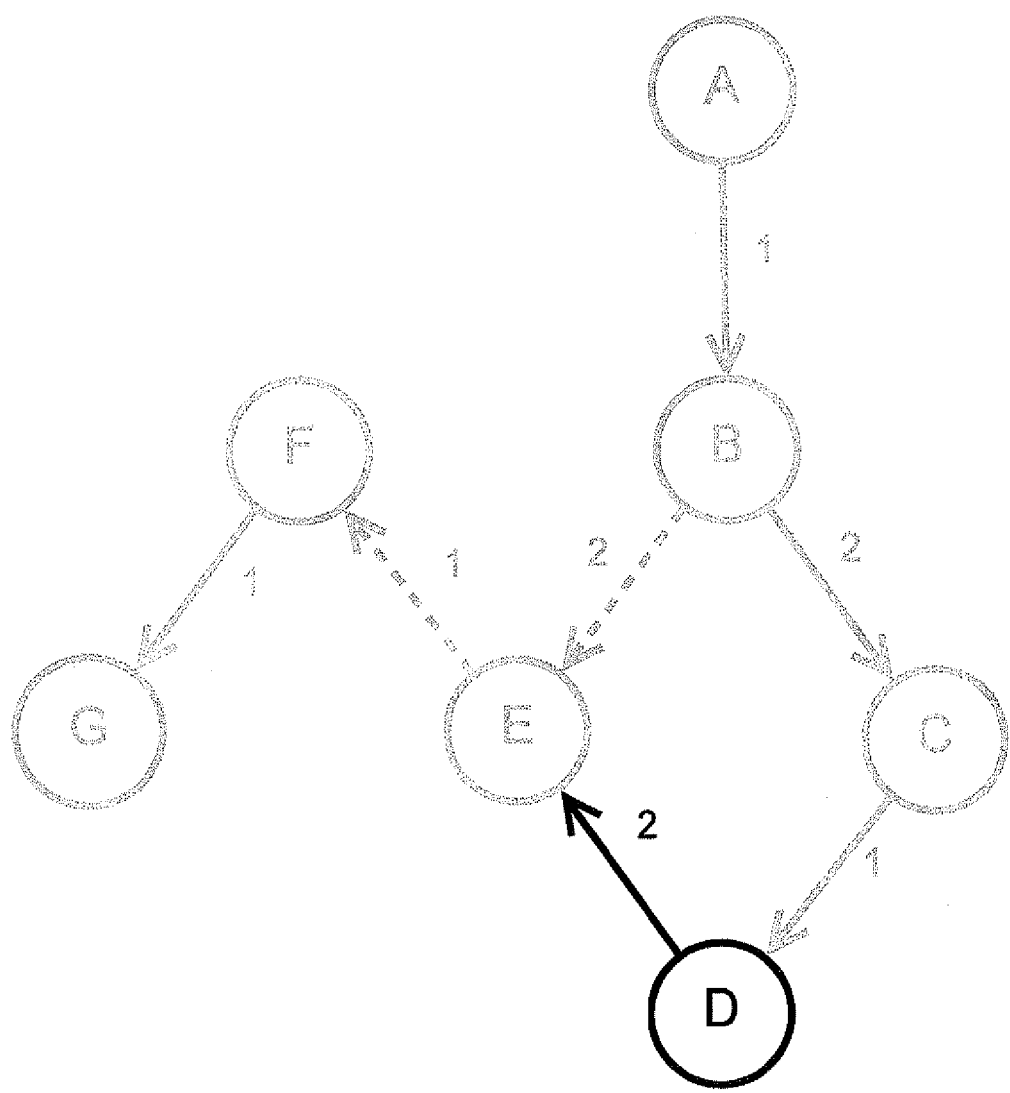
FIG. 14 illustrates an iteration of an embodiment as applied to the appearance of D in the second universe, according to an embodiment.

Referring now to FIG. 14, illustrated is an iteration of an embodiment as applied to the appearance of intersection D in the second universe. As in previous iterations, the other appearances, that is, the appearance of D (in the third universe) and the appearance of F (in the fourth universe), remain in the priority queue data structure. An appearance of E is created in the second universe with a cost of 6 and a route pointing to the appearance of intersection D in the second universe.

Figure 15:
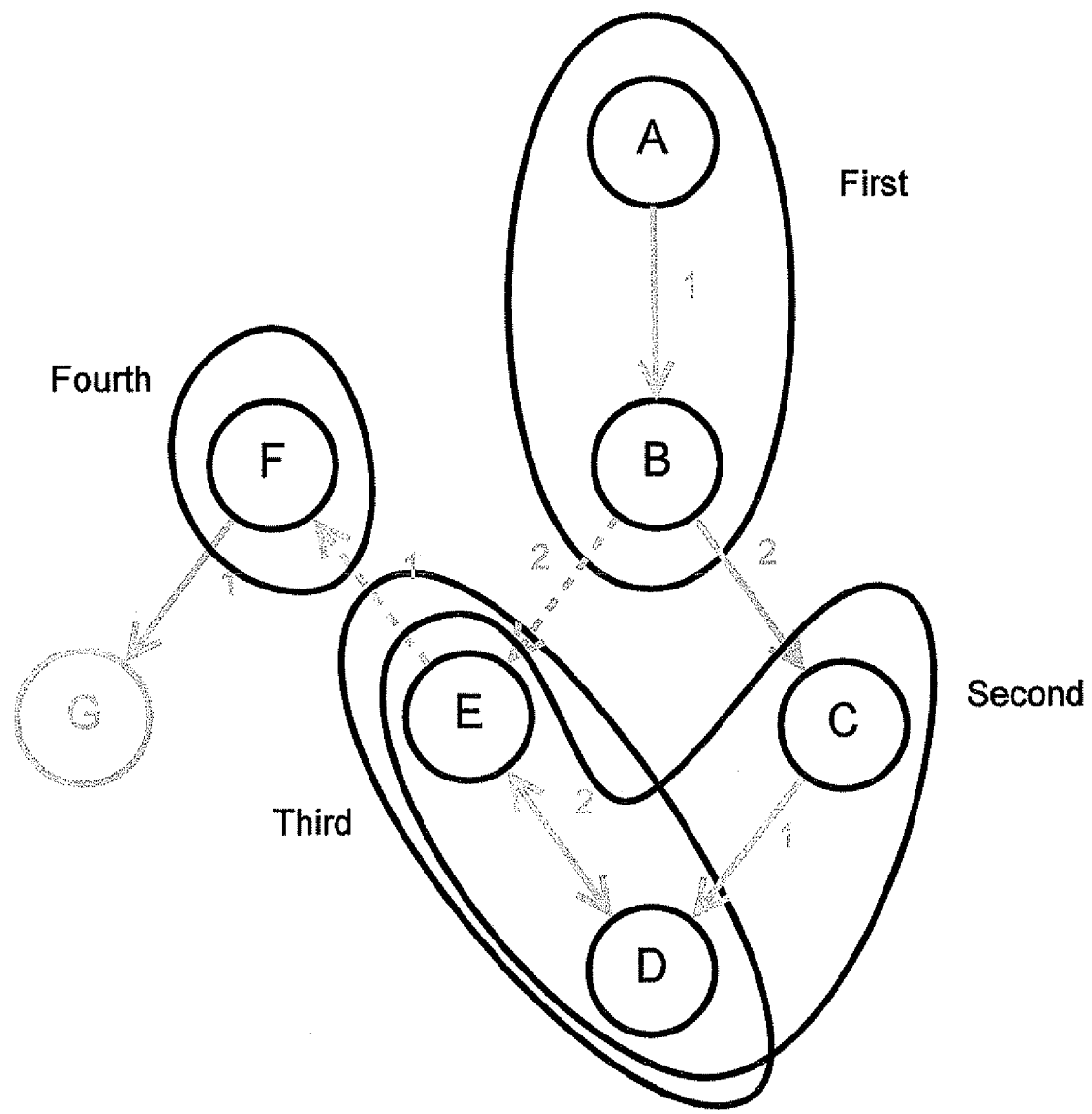
FIG. 15 depicts the universes after the iteration in FIG. 13, according to an embodiment.

Referring now to FIG. 15, intersections D and E appear in both the second and third universes, while the other intersections appear in only one universe (or no universes in the case of intersection G).

Figure 16:
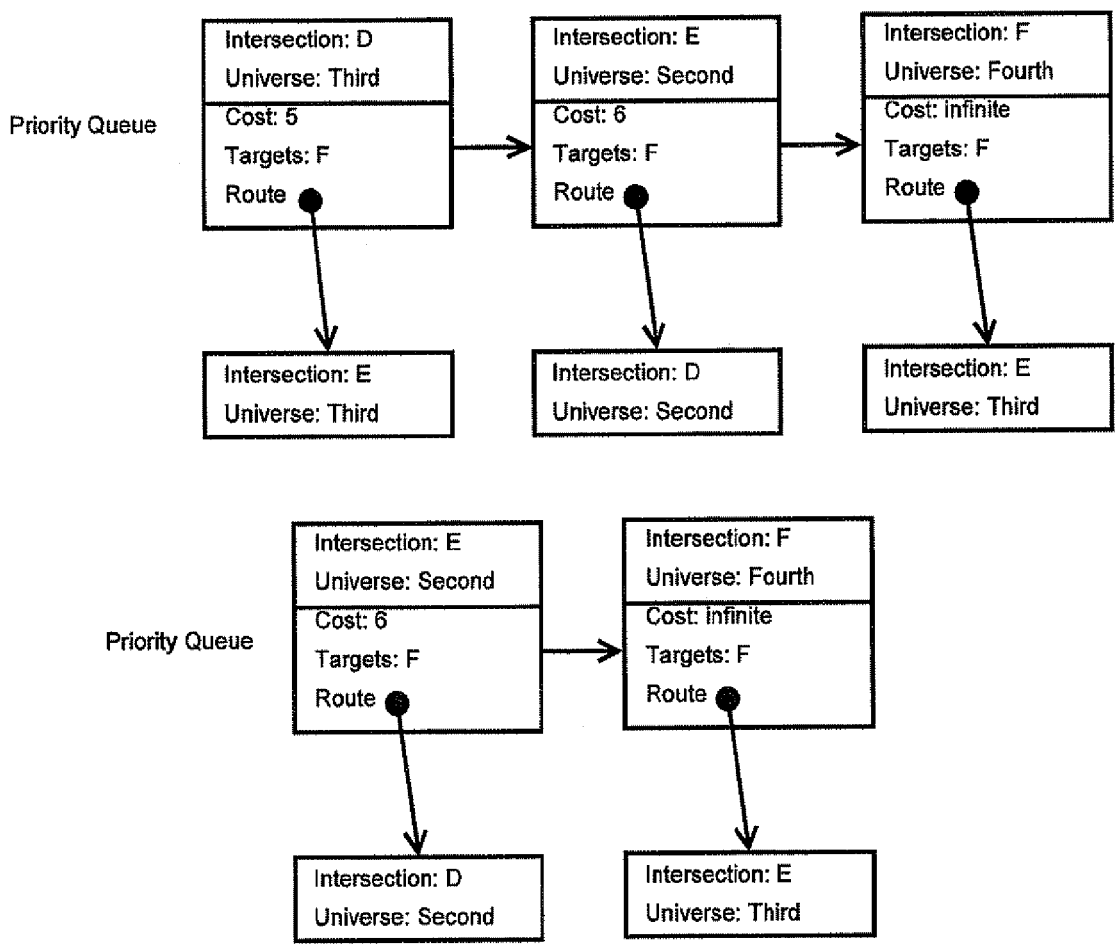
FIG. 16 depicts the contents of a data structure after FIG. 14 in the first part, and in the second part, as it appears following the discarding of the edge from D→E as a result of the edge being not on a constraint and having been seen before, according to an embodiment.

Referring now to FIG. 16, the upper priority queue data structure shows the configuration following the operation in FIG. 14. The next operation, not shown in any figure, is an attempt from the appearance of D in universe three to follow the edge back from whence it came to intersection E. This attempt fails, because the edge D→E has already been followed in FIG. 14 and the edge is not on a multi-edge constraint. Failed attempts of this nature occur regardless of the whether the edge was seen in the same universe or not. The lower priority queue data structure shows the configuration following the failed attempt.

Figure 17:
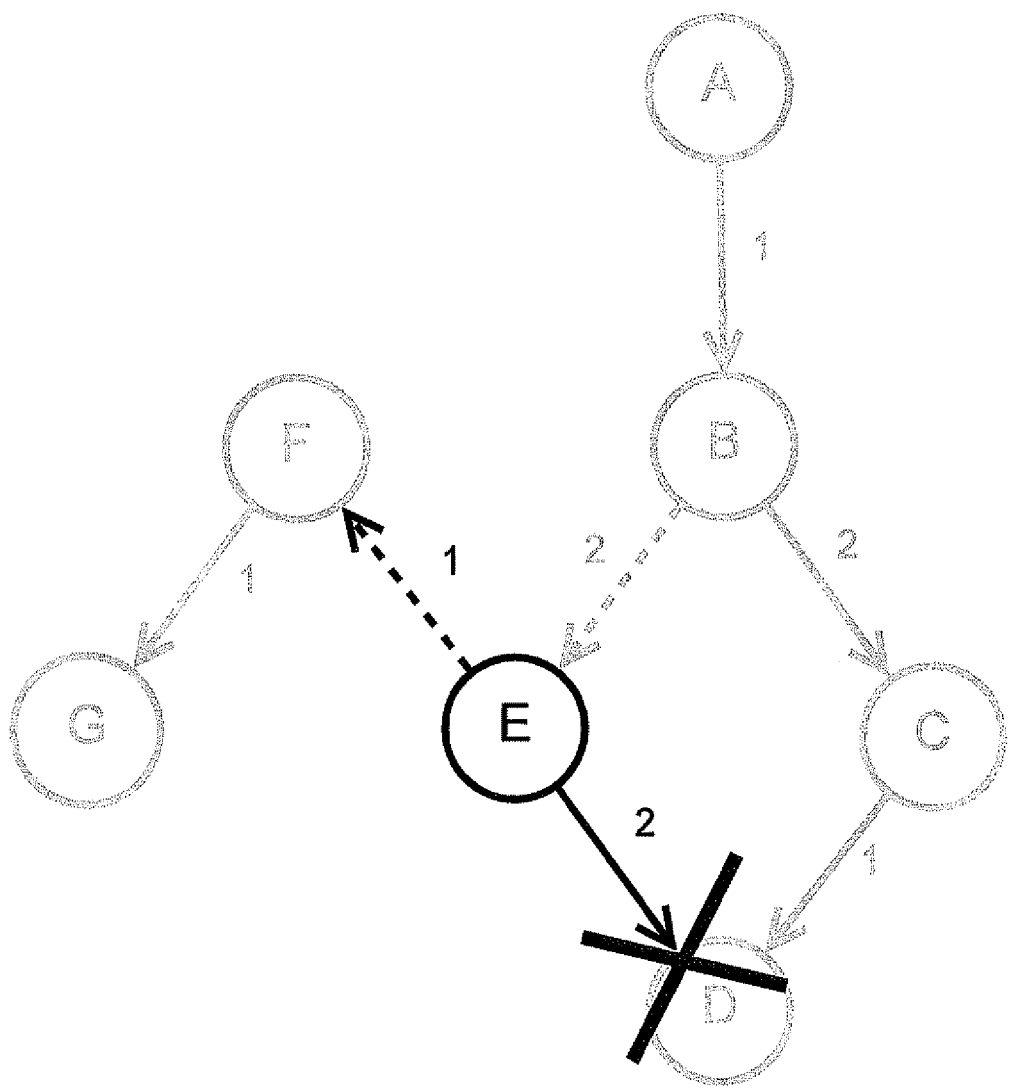
FIG. 17 illustrates an iteration of an embodiment as applied to the appearance of E in the second universe, according to an embodiment.

Referring now to FIG. 17, illustrated is an iteration of an embodiment as applied to the appearance of intersection E in the second universe. The edge E→D fails due to the fact that the edge E→D has already been followed from an appearance of E in another universe (universe three in FIG. 11), along with the fact that E→D is not on a multi-edge constraint. Intersection F appears in a new universe, universe five with a cost of 7, and the route pointing to the appearance of intersection E in universe three.

Figure 18:
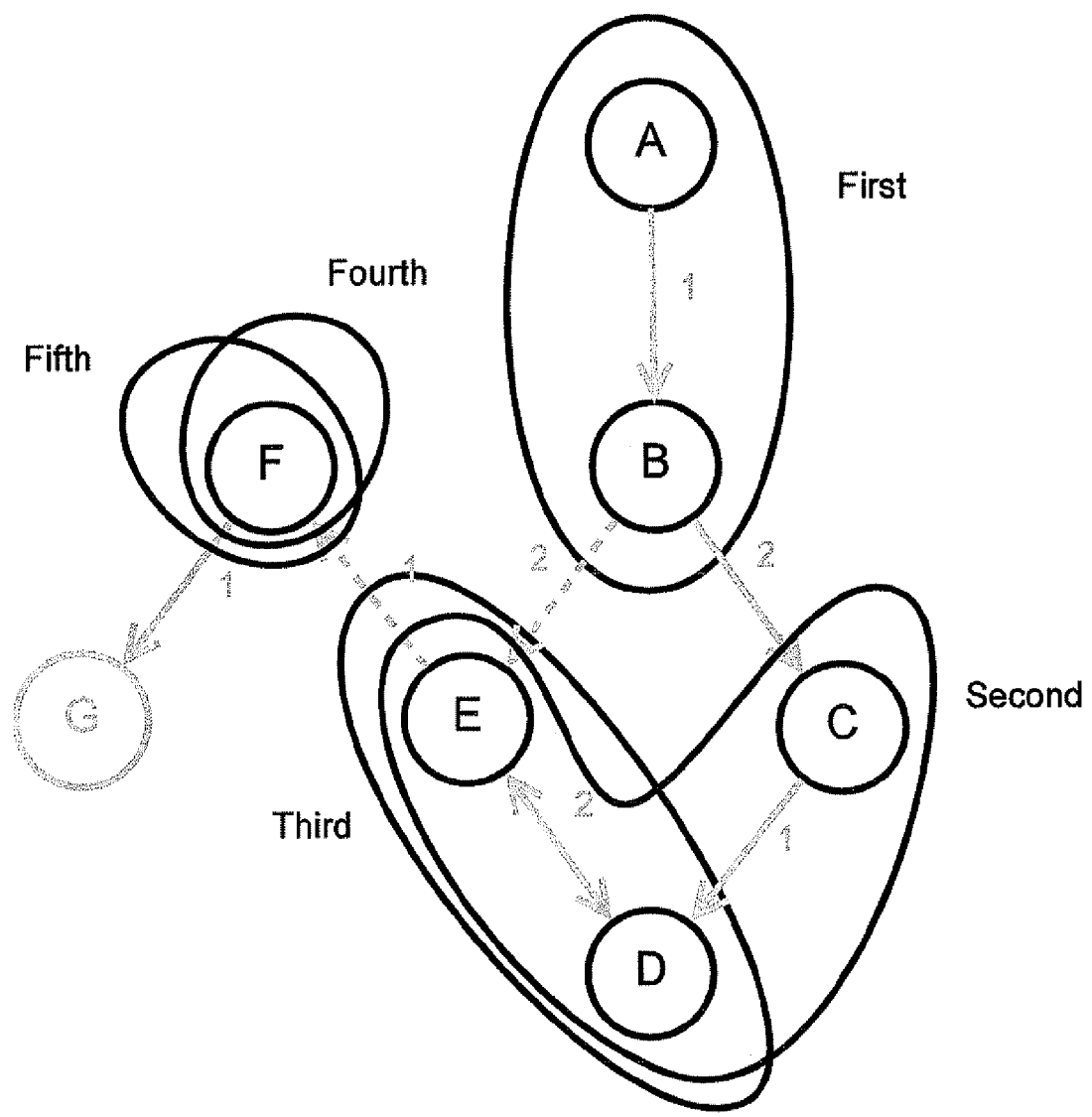
FIG. 18 depicts the universes after the iteration in FIG. 17.

Referring now to FIG. 18, the appearance of F in two universes, four and five, can be seen, according to one embodiment.

Figure 19:
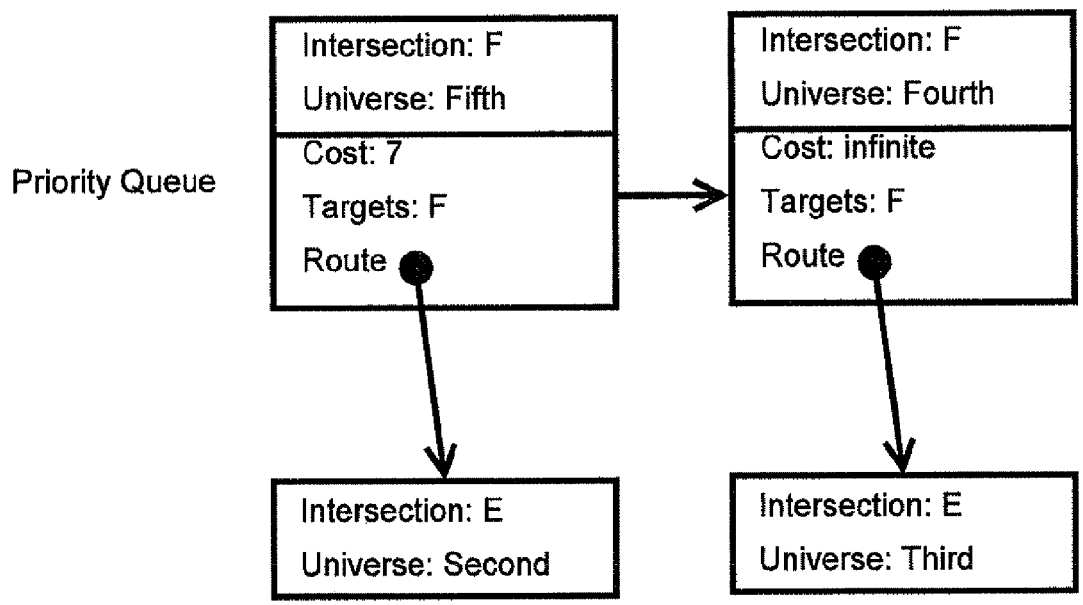
FIG. 19 depicts the contents of a data structure after the iteration in FIG. 17, according to an embodiment.

Referring now to FIG. 19, the priority queue data structure contains intersection F appearing twice, once in universe five with a cost of 7 and a route pointing to intersection E as it appears in universe two, and once in universe four with an infinite cost and a route pointing to intersection E as it appears in universe three.

Figure 20:
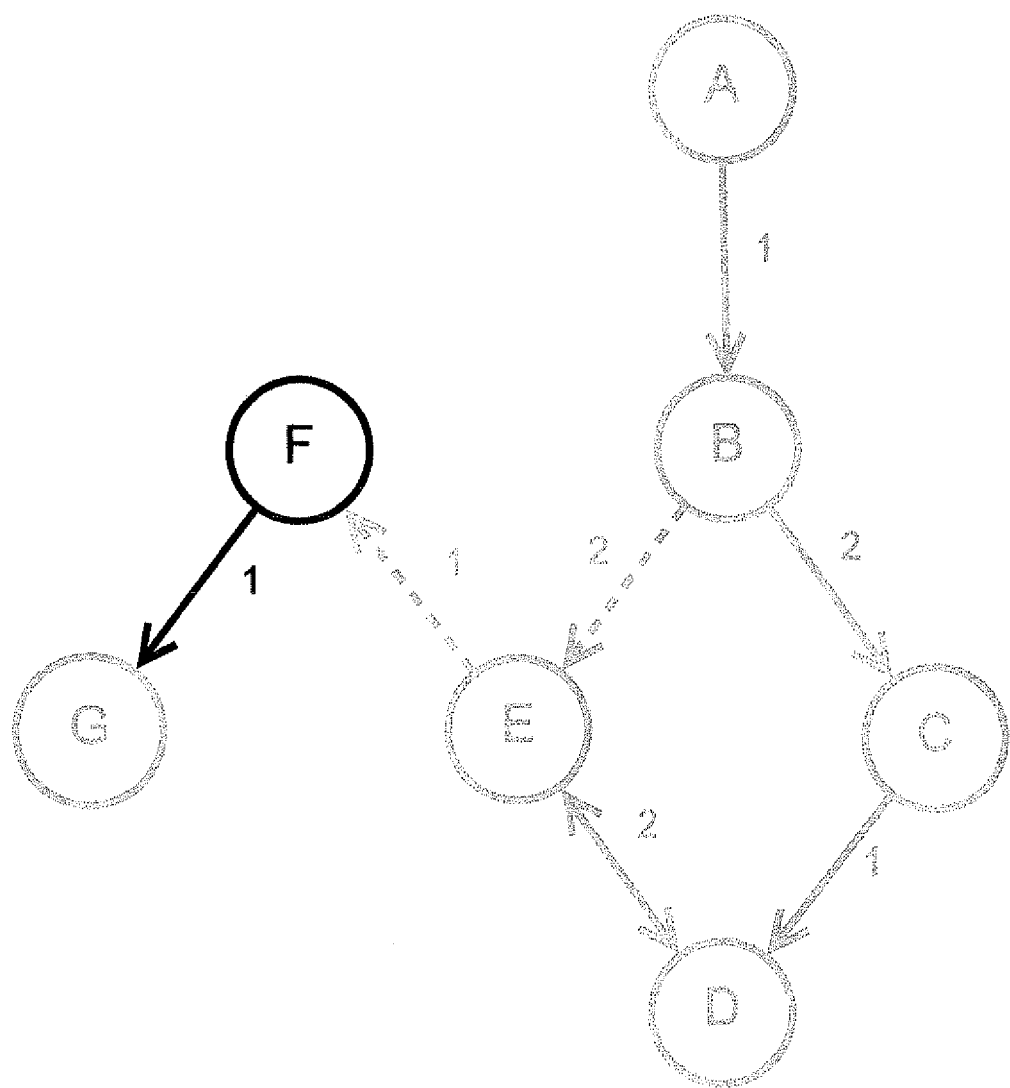
FIG. 20 illustrates an iteration of an embodiment as applied to the appearance of E, now in the first universe following the combining of universes after the finding of the target intersect F for which the additional universes were created, according to an embodiment.

Referring now to FIG. 20, illustrated is an iteration of an embodiment as applied to the appearance of F in universe five, Because F is a target for a number of universes, those universes no longer have a need to exist, and collapse back into universe one.

Figure 21:
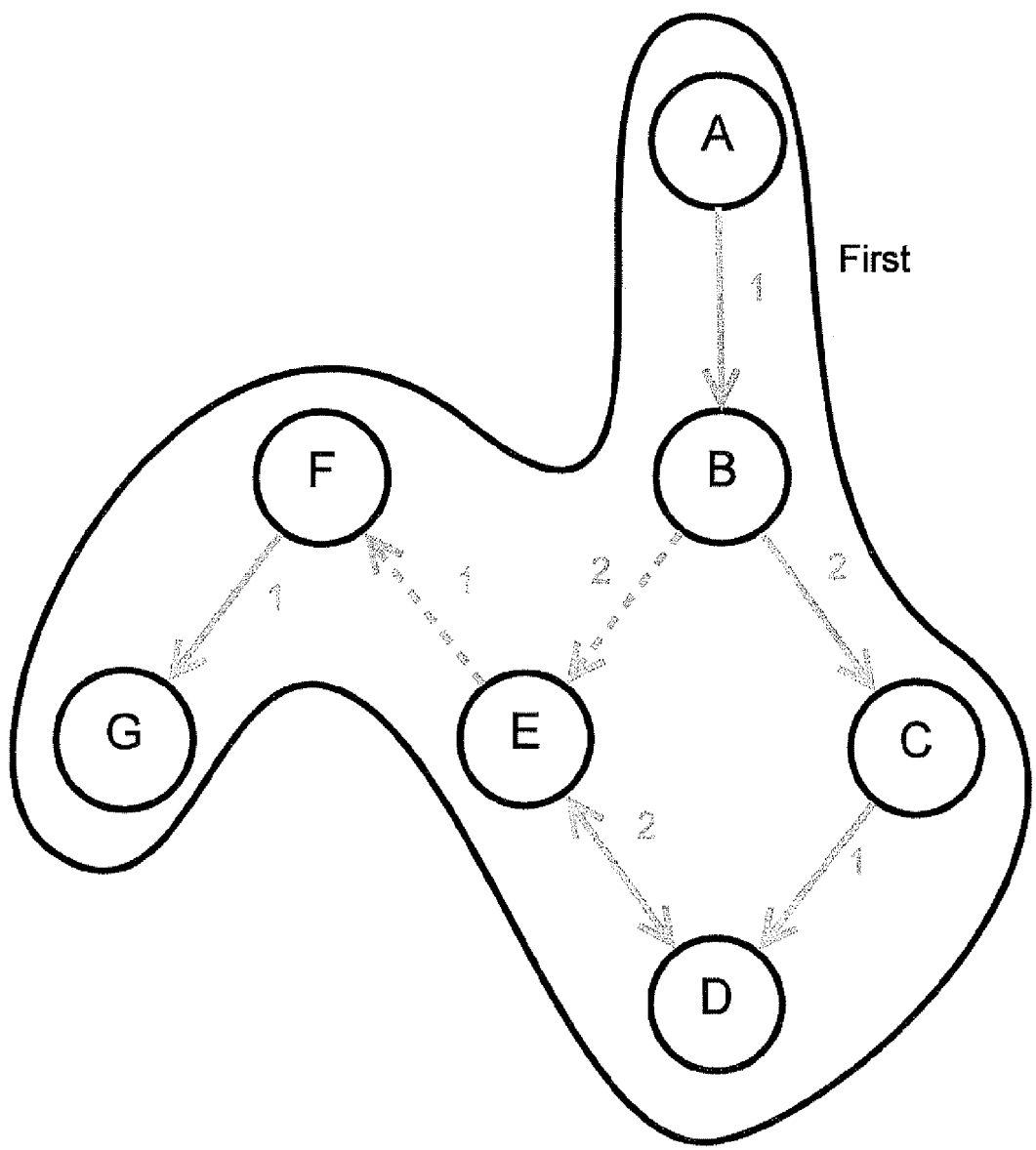
FIG. 21 illustrates the combining of additional universes into universe one following the finding of a target, according to an embodiment.

Referring now to FIG. 21, the collapse of the multiple universes back into universe one is illustrated.

Figure 22:
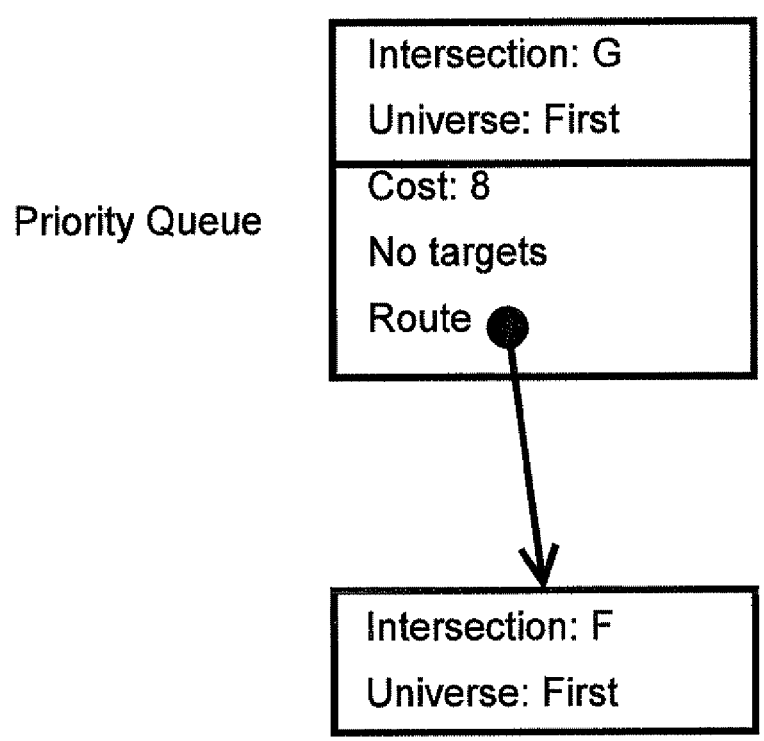
FIG. 22 illustrates the data structure at the end of the process, according to an embodiment.

Referring now to FIG. 22, the priority queue data structure contains intersection G, the target intersection. Following the successive route links back through the data structure will yield the correct route A→B→C→D→E→F→G in reverse order.

Figure 23:
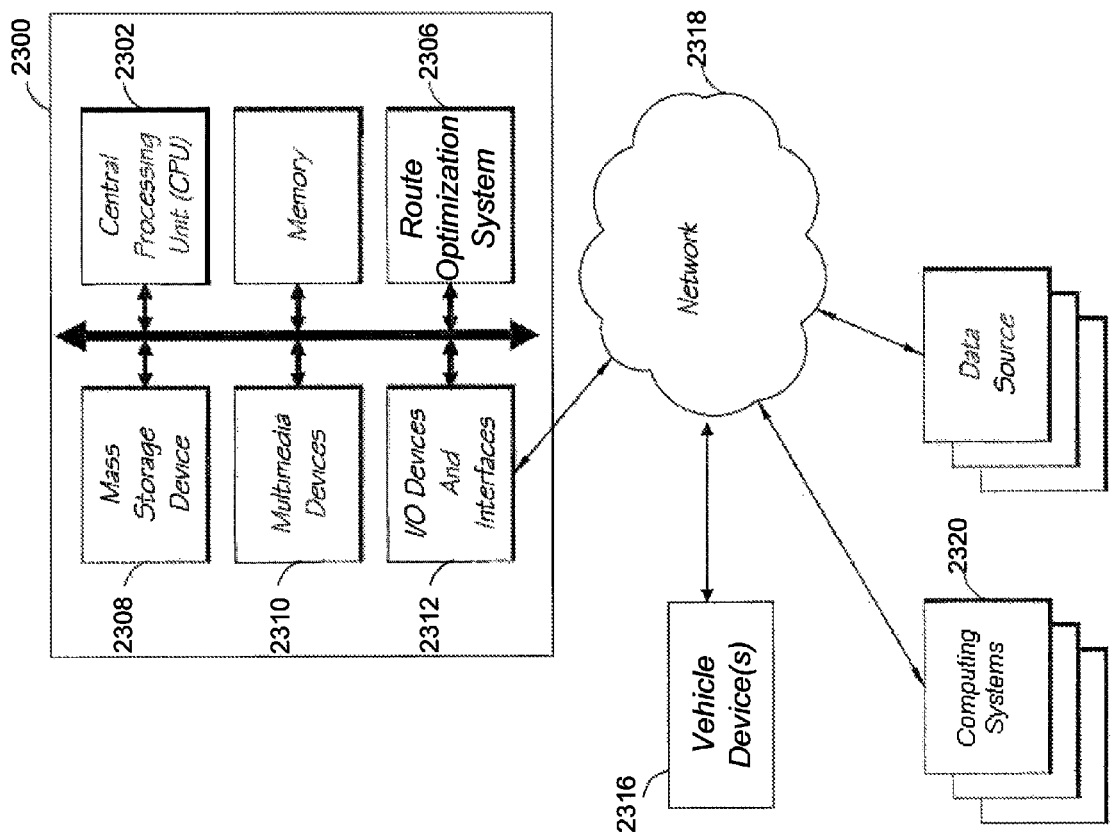
FIG. 23 illustrates a block diagram depicting an embodiment of a computer system configured to run software for implementing one or more embodiments of the route optimization systems described herein

With reference to FIG. 23, a further embodiment is computer readable code or program instructions on one or more computer readable mediums capable of carrying out processes discussed above. A computer readable medium is any data storage device that is capable of storing data, or capable of permitting stored data to be read by a computer system, for example, the mass storage device 2308. Examples include hard disk drives (HDDs), flash memory cards, such as CF cards, SD cards, MS cards, and xD cards, network attached storage (NAS), read-only memory (ROM), random-access memory (RAM), CD-ROMs, CD-Rs, CD-RWs, DVDs, DVD-Rs, DVD-RWs, holographic storage mediums, magnetic tapes and other optical and non-optical data storage devices. The computer readable medium can also be in distributed fashion over multiple computer systems or devices 2320 which are coupled or otherwise networked together and capable of presenting a single view to a user of the medium.

In reference to FIG. 23, a further embodiment is a computer system 2300 or similar device configured to access computer readable code or program instructions from a computer readable medium and to execute program instructions using one or more CPUs 2302 to carry out embodiments of the route optimization system 2306 or other systems disclosed herein. Such computer system can be, but is not limited to, a typical personal computer, microcomputers, a handheld device such as a cell phone, PDA, BlackBerry phone, personal gaming machine, a personal or in-dash navigation system, a GPS enabled device, a network router, or a more advanced system such as a computer cluster, distributed computer system, server accessed over wired or wireless devices, a mainframe, or a supercomputer. In some embodiments, upon general completion of processes as discussed above, the computer system's computer readable medium contains a sequence of information objects where each information object represents a node, and the entire sequence of information objects represents the sequence of nodes which make up the shortest path through the network. In other embodiments, during a step of a process discussed above, content in the data structure is stored in the computer readable medium. In another embodiment, content removed from the data structure is deleted from the computer readable medium.

In some embodiments, the sequence of information objects is transmitted via a data-transmission network 2318, such as an Ethernet, BLUETOOTH network or infra-red network to a second computer system. In other embodiments, some or all of the content stored in the computer readable medium is transmitted via a similar network.

In other embodiments, the computer system generates signals or instructions based on the results of the program instructions and/or the contents of the computer readable medium. For instance, according to some embodiments, the computer system reads the sequence of information objects and uses the sequence to generate signals or instructions through the use of multimedia devices 2310. In some embodiments, the signals or instructions are perceptible by a user of the computer system. For example, the computer system can generate visual instructions or signals based on the results of the program instructions, thereby permitting a user of the computer system to follow an optimal route to a destination. For example, a computer system according to one embodiment generates one or more images on an LCD, a heads-up display, on paper via a printer, or by using a similar display device to instruct a user of the system which way to travel. Such instructions, for example, may comprise a street map with visual aids directing a user to travel down specific streets, or may comprise written directions from the driver's origination or current location. In some embodiments, the visual aids are arrows or similar colored lines overlaid over a street map. In some embodiments, the driver's progress is displayed on the screen, and the visual aids or directions update as the driver moves. In some embodiments, the images simulate motion, such as a vehicle traveling down a city street. In some embodiments, the screen is interactive. For example, in some embodiments the user can input his current and destination locations, update costs for given streets or routes, or change his destination en route.

In other embodiments, the computer system generates audible instructions or signals, thereby permitting a user of the computer system to follow an optimal route to a destination. Such signals may comprise, for example, beeps or tones that are generated when a driver approaches a pertinent intersection, or may comprise verbal directions, such as "turn left ahead." In some embodiments, the verbal directions are in a language the user understands, such as English or French, and the language can be changed by the user of the system based on their personal preferences.

In some embodiments, the computer system is integrated into an automobile navigation system or similar system. For example, in some embodiments, the visual outputs of the computer system are output via the car's in-dash video display, and/or the audio outputs of the computer system are output via the car's audio speakers. In other embodiments, a vehicle or similar device 2316 is controlled directly by the computer system. For example, the computer system generates control instructions and transmits those control instructions directly to a vehicle's engine, steering, braking, and other components to control these components and to maintain the vehicle on the required path. In other embodiments, the computer system generates control instructions to control the direction and motion of robots, machines with propulsion and steering components such as engines and actuators, or similar machines to maintain the robots or similar machines on a specified path. For instance, the computer system sends signals to a robot's actuators or motors. Based on these signals, the motors or actuators are activated or deactivated. The robot's motion can thereby be controlled in any manner desired. The computer system controls the robot's motion to maintain the robot on a desired path.

In some embodiments, the computer system routes data packets to destination computers or routers using variations of the processes discussed above using for example, input/out devices and interfaces 2312. For example, a router incorporating embodiments can minimize data transmission time to a destination computer by determining the optimal path to route incoming data packets and routing the incoming data packets accordingly.

In some embodiments, the computer system is used to route packages or similar objects to a specified location in an optimal manner. For instance, to route a package from New York, USA to Tokyo, Japan in the fastest manner, at destinations along the trip, such as a shipper's routing hub or sorting facility, the computer system generates signals to route the package onto the optimal transport, such as a non-stop flight or an overnight freighter to maintain the package on the shortest path, in this case based on transit time, to its destination.

In some embodiments, multiple systems utilizing the processes described above work in unison to achieve a general result. For instance, multiple vehicles operating according to an embodiment can communicate with each other in real time to update travel costs and coordinate optimal paths for each of the vehicles uniquely. In another embodiment, each vehicle is given a route that minimizes the total travel time for the group of vehicles as a whole, though not necessarily each vehicle individually. In another embodiment, a collection of routers operate in a similar manner, and update each other with data bottlenecks and other problems in real time. For example, in one embodiment a collection of routers is configured to route data packets to a destination in the most efficient manner.

Basics of Pseudo Code According to an Embodiment

An Intersection is represented as having:
    id: a number uniquely identifying this Intersection.
    edges: list of edges coming from this Intersection
    appearances: list of appearances in universes.

An appearance of an intersection in a universe belongs to an Intersection, and is represented as having:
    uid: A number uniquely identifying the universe in which the intersection appears.
    targets: a list of Intersections that the universe (in which this intersection appears) was created for the purpose of finding. Targets are the intersections at the end of multi-edge constraints.
    route: The previous Appearance (where we came from). Following the route iteratively back through Appearances will give all the Intersections from the start of the route up to this Intersection.
    cost: The cumulative cost of getting to this Intersection. The sum of each edge that has been traversed up to this Intersection.
    on ActiveConstraint: true/false value indicating whether this edge is on an active constraint in this universe. Being on an active constraint means that our immediate previous history (as given by route above) includes at least one, but not all, the edges of a multi-edge constraint. Using the FIG. 1 example, if our intersection is E, and our history is A→B→E, then on ActiveConstraint would be true, because our immediate history (B-E) is a prefix of the active constraint B-E-F. Alternatively, if our history is A-B-C-D-E, then on ActiveConstraint would be false because, even though we are at Intersection E which is part of a constraint, we came to intersection E from an intersection (D) which is not part of that constraint.
    in Heap: True/false value indicating whether this Appearance is in the heap. This indicates whether the Appearance of this intersection is still a candidate from which we can traverse the edges (True), or has already has its edges searched (False).

Start conditions:
    The starting intersection has one appearance (in universe 0) in its list of appearances. It has no targets (targets are only for cases where the universe was split to get around a multi-edge constraint). The cost is 0, and the route is null.

Pseudo Code According to an Embodiment

```
Intersection start
heap. Insert (start)
while heap not empty (
    Intersection I = heap.DeleteMin( )
Appearance A = I. getMinimumAppearance( )
A.inHeap = false
if I is final goal intersection (
    break
)
if A.hasTarget(I) (
    # This universe (or an ancestor universe) was created for the
    # purpose of finding I, and now we've found it.
    # So all universes with I as target are candidates for rejoining
    # to universe 0 (if they have no other targets)
    foreach Intersection K in heap (
        foreach appearance B of K (
            if B has target I (
                remove target I from B
                if B has no more targets (
                    B. id = 0      # B 'merges' back into universe 0
                    if K has another universe with id 0 (
                        remove other universe with id 0.
                    )
                )
            )
        )
    )
)
```

-continued

```
split = false
if A.onActiveConstraint and A still has remaining targets (
    split = true
)
foreach edge I->J (
    if I->J is start of multi-edge constraint and J not seen in
universe A.id(
            split = true
        )
    )
    foreach edge I->J (
        if I->J has already been seen in another universe and (I-
>J).id is not on a constraint (
            skip edge I->J # The other occurrence of I->J is cheaper;
this one won't result in any better costs later on.
        )
        If I_>J is start of multi-edge constraint and
A.onActiveConstraint is not true and I->J has been seen before (
            skip edge I->J
)
        if I->J has any single-edge constraints (
            (I->J) .cost = maximum of all applicable single-edge
constraints.
        )
        if split == true (
        Appearance V = new appearance with V.ID = new unique universe
id.
        V.targets = list of each intersection occurring at the end of
each multi-edge constraint starting from I
            if I->J is the first edge of a multi-edge constraint (
                V.onActiveConstraint = true
            ) #end if
            if A.onActiveConstraint and I->J continues active constraint (
                V.onActiveConstraint = true
                if I->J is end of constraint (
                    (I->J).cost = constraint cost.
                ) #end if
            ) #end if A.onActiveConstraint and I->J continues active
constraint
        ) #end if split == true
        else ( # no split
            if J.hasAppearanceWithID(A.ID) (
                #already seen intersection in this universe.      if
J.costInAppearance(A.ID) <= U.cost + (I->J).cost (
                    continue #previously seen appearance is lower cost
than this one ) else (
                    Appearance V = J.getAppearanceWithID(A.ID)
                )
            )          else (
                Appearance V = new appearance with V.ID = A. ID
            ) #end if J.hasAppearanceWithID(A.ID)
        ) #end else
        V.cost = A.cost + (I->J).cost
        V.route = A
        J.AddAppearance(V)
        if J in heap (
            if J.getMinAppearance( ).cost > V.cost (
                heap.Decrease(J)
            )
        ) else (
            heap.Insert(J)
        )
    ) #end foreach
) #end while
```

Figure 24:
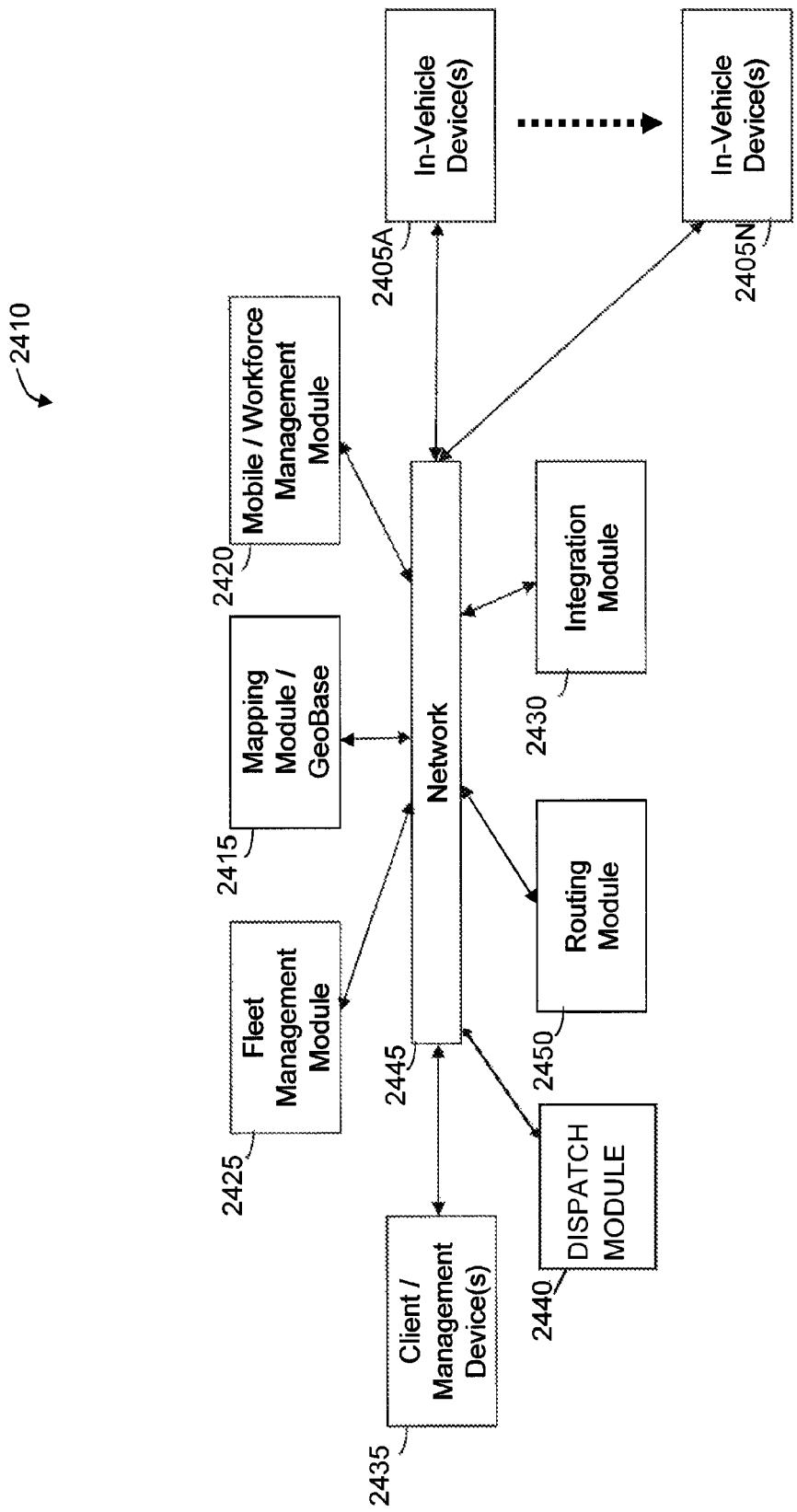
FIG. 24 illustrates an embodiment of a vehicle management system having a routing module that performs routing based on one or more factors or variables.

FIG. 24 illustrates an embodiment of a computing environment for implementing an example vehicle management system 2410. Among other features, the vehicle management system 2410 can perform vehicle routing using energy usage considerations in addition to or instead of time and distance considerations.

In the computing environment, one or more in-vehicle devices 2405A . . . 2405N (referenced collectively as 2405) and management devices 2435 communicate with the vehicle management system 2410 over a network 2445. The in-vehicle devices 2405 can include computing devices installed in fleet vehicles. These devices 2405 can include navigation functionality, routing functionality, and the like. The in-vehicle devices 2405 can receive route information and other information from the vehicle management system 2410. In addition, the in-vehicle devices 2405 can report information to the vehicle management system 2410, such as driver location, speed, energy consumption, and so forth.

The management devices 2435 can be computing devices used by dispatchers, administrators, or other users to manage different aspects of the vehicle management system 2410. For example, a user of a management device 2435 can access the vehicle management system 2410 to dispatch vehicles and drivers and perform other fleet management functions. With the management devices 2435, users can access and monitor vehicle information obtained from the in-vehicle devices 2405 by the vehicle management system 2410. Such information can include data on energy usage, vehicle routes used, stops, driver behavior and performance, vehicle emissions, vehicle maintenance, and the like. In some embodiments, the management devices 2435 are located at a dispatch center.

The vehicle management system 2410 can be implemented by one or more physical computing devices, such as servers. These servers can be physically co-located or can be geographically separate, for example, in different data centers. Advantageously, in the depicted embodiment, the vehicle management system 2410 includes a routing module 2450 that can perform energy-based routing. The routing module 2450 can select at least some routes for the vehicles that reduce energy use costs, improve operational efficiencies, improve customer service, and/or reduce vehicle emissions. The routing module 2450 can automatically select routes that take into account factors that affect energy usage, such as terrain or elevation, vehicle characteristics, driver characteristics, road conditions, traffic, speed limits, stop time, turn information, traffic information, and weather information, and the like.

For example, given two equally feasible routes that would result in on-time deliveries for a delivery company, the routing module 2450 may select the route with lowest energy cost based on one route having more level elevation than the other route. Due to the more level elevation, the chosen route can result in less energy consumption for some types of vehicles (such as gasoline vehicles).

The type of vehicle used can also factor into route selection. Many different types of vehicles can be used in a fleet managed by the vehicle management system 2410. Some examples include gasoline powered vehicles (e.g., gas or diesel), electric vehicles, hybrid vehicles, and alternative fuel vehicles. Electric-vehicles can include battery-operated or solar power vehicles. Hybrid vehicles can operate using a combination of internal combustion and electric motor drives, while alternative fuel vehicles may be powered by such fuels as hydrogen, ethanol, biodiesel, propane, other petroleum-based products, or the like. Since different types of vehicles consume energy differently, the routing module 2450 can select different routes for different vehicle types, wherein vehicle types at least include diesel vehicles, gasoline vehicles, electric vehicles, and hybrid vehicles. In an embodiment, vehicle types are based on kinds of vehicle propulsion systems. Route selection based on vehicle type and other energy usage factors are described in detail below.

Other modules of the vehicle management system 2410 include, in the depicted embodiment, a fleet management module 2425, a mapping module 2415, a workforce management module 2420, an integration module 2430, and a dispatch module 2440. The fleet management module 2425 can include functionality for managing vehicles in a fleet. For example, the fleet management module 2425 can allow users to schedule and monitor vehicle preventative maintenance, vehicle operating costs, and the like. The mapping module 2415 can provide mapping functionality that provides worldwide mapping data, including terrain or elevation data. The mapping module 2415 can be accessed by the routing module 2450 to provide mapping and elevation data for different routes. The mapping module 2415 may also be accessed by the in-vehicle devices 2405 in some embodiments.

The workforce management module 2420 can provide communication functionality with the in-vehicle devices 2405 or with drivers' mobile handheld devices (not shown) to connect drivers with the vehicle management system 2410. The integration module 2430 can facilitate integration of the vehicle management system 2410 with other systems, such as fuel card systems, payroll systems, supply chain system, insurance systems, and the like. The dispatch module 2440 can provide functionality for users of the management devices 2435 to assign drivers and vehicles to routes selected by the routing module 2450.

The illustrated network 2445 may be a LAN, a WAN, the Internet, combinations of the same, or the like. For ease of illustration, the vehicle management system 2410 has been depicted as a centralized system. However, in other implementations, at least some of the functionality of the vehicle management system 2410 is implemented in other devices. For instance, the in-vehicle devices 2405 may implement the routing functionality described herein. Other possible implementations of the vehicle management system 2410 can include many more or fewer components than those shown in FIG. 24.

Routing Module Embodiments

Figure 25:
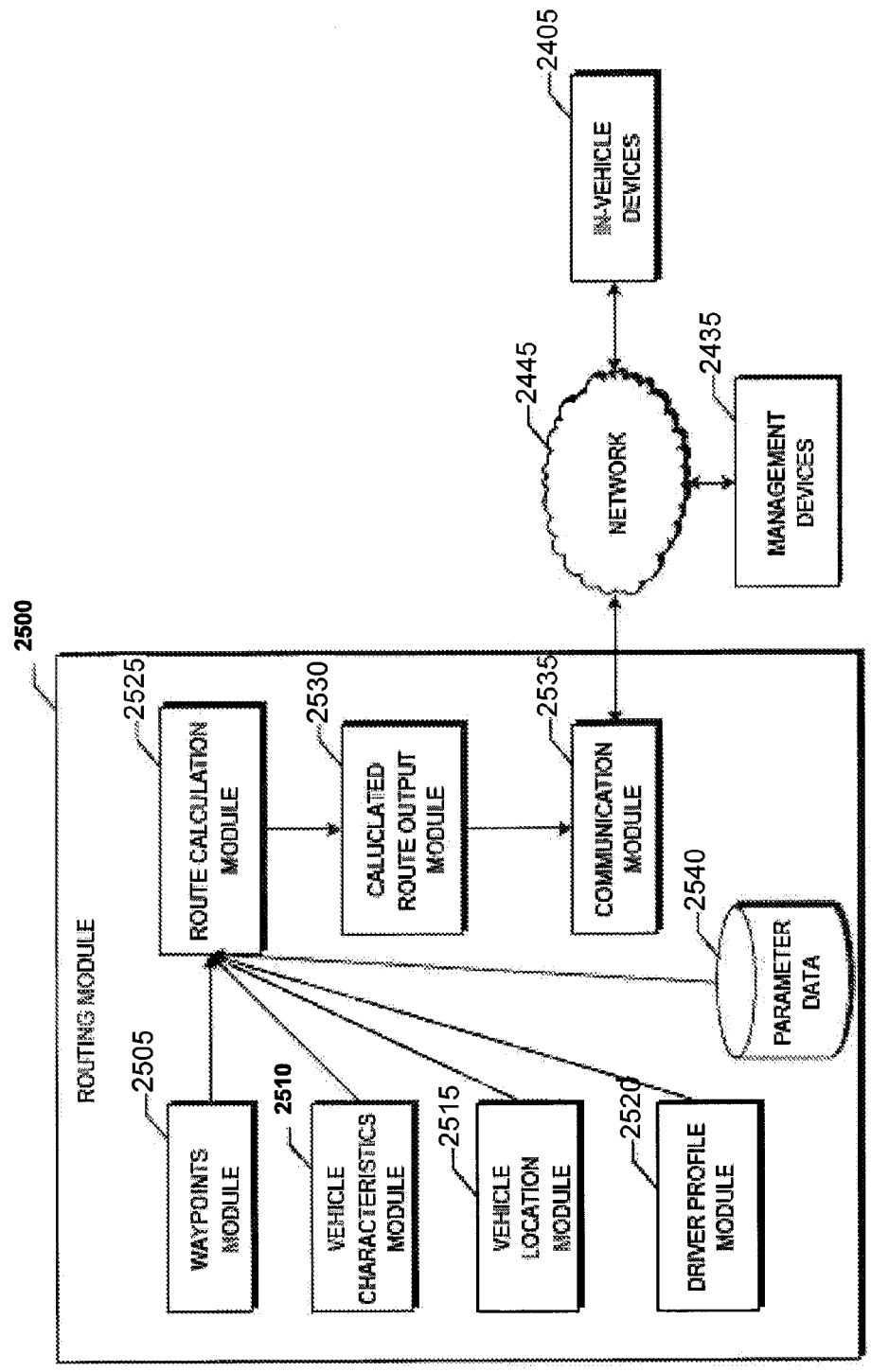
FIG. 25 illustrates an embodiment of a routing module usable with the system of FIG. 23.

Turning to FIG. 25, an embodiment of a routing module 2500 is shown that is a part of the computing platform for a route optimization system. The routing module 2500 is a more detailed embodiment of the routing module 2450 described above and includes all the features thereof. The routing module 2500 can select a route that reduces or minimizes the energy use of a vehicle. In some embodiments, the routing module 2500 can select routes that reduce energy use for multiple vehicles. In some embodiments, the routing module 2500 can reduce energy usage based on any of the factors described above, for example, by selecting particular vehicles and/or particular drivers for a route based on their energy usage characteristics. The management devices 2435 and in-vehicle devices 2405 of FIG. 24 are also shown communicating with the routing module 2500 over the network 2445.

In the depicted embodiment, the routing module 2500 includes a waypoints module 2505, a vehicle characteristics module 2510, a vehicle location module 2515, a driver profile module 2520, a route calculation module 2525, a calculated route output module 2530, and a communication module 2535. The routing module 2500 can also include one or more parameter databases or data repositories 2540 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), and the like.

The waypoints module 2505 can access waypoint data useful for constructing a route. The waypoint data can include a starting location, a target or destination location, intermediate waypoint locations, landmarks, and the like. The starting and ending location as well as possibly other waypoints can be input by a user of a management device 2435. At least some of the waypoints data can also be provided to the waypoints module 2505 from the mapping module 2415 described above.

The vehicle characteristics module 2510 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, and the like.

The vehicle location module 2515 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 2405 or within a mobile device (e.g., a phone) carried by an operator of the vehicle.

The driver profile module 2520 can store and/or determine driver characteristics or behavior that affects energy usage. For example, a driver can develop a habit for aggressive driving (e.g., hard, rapid acceleration and deceleration and/or speeding) or for laziness (e.g., long idling times or break times). In some embodiments, the driver profile module can also include data such as age, preferred driving times, preferred days of work, wage information, overtime information, number of years of experience, and the types of vehicles the driver is trained or licensed to operate.

The route calculation module 2525 can determine one or more alternative feasible, or candidate, routes from a starting waypoint to a destination waypoint. The feasible routes can be determined using one or more initial searching algorithms based on one or more initial criteria, factors or variables (e.g., distance and/or estimated transit time) to trim down the search space to exclude unreasonable routes. The feasible routes can be determined based on input received from the waypoints module 2505, the vehicle type module 2510, the vehicle location module 2515, the driver profile module 2520, and/or the parameter database 2540. In some embodiments, the route calculation module 2525 identifies a route that selects energy use based on the input received.

The route selection determination methods will be described in more detail below; however, any number of search algorithms or methods can be used without departing from the spirit and/or scope of the disclosure, including but not limited to, breadth-first algorithms, depth-first algorithms, best-first algorithms, Djikstra's algorithm, the Hungarian (Munkres) algorithm, the A* algorithm, Traveling Salesman-related algorithms, linear programming algorithms, and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function is described in U.S. Patent Application Publication No. 2010/0153005, filed on Dec. 8, 2009, the disclosure of which is hereby incorporated by reference in its entirety.

The calculated route output module 2530 can output the one or more routes identified by the route calculation module 2525. The routes can be output to a vehicle-based display unit, a handheld mobile device, and/or to a remote location over the network 2445 (e.g., the client computing device 2435, the dispatch center 2440). In some embodiments, the calculated route output module 2530 can output feedback to a driver (e.g., directions, instructions, warnings, alerts, alarms). For example, the calculated route output module 2530 can output a real-time suggested driving speed that can minimize or reduce energy use. The output feedback can include voice commands, audible alerts, and/or on-screen text or graphics. The feedback can advantageously change driver behavior to improve energy efficiency and reduce energy use. In some embodiments, the calculated route output module 2530 is in communication with, and controls operation of, a display device and/or one or more audio devices.

In some embodiments, the calculated route output module 2530 generates audible instructions or signals, thereby permitting a user of an in-vehicle device 2405 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences.

The communication module 2535 can facilitate communication by and with the routing module 2500 over the network 2445. In some embodiments, the communication module 2535 receives data from the network 2445 and transmits data to the management device 2435 and to the in-vehicle devices 2405. The communication module 2535 can provide the route calculation module 2525 with access to network resources or information databases, such as traffic and weather web sites, over the network 2445.

The parameter database 2540 can include one or more storage databases or other data repositories. In addition to storing the various road parameters described above, the parameter database can store any accessed or computed data that may be used to determine the costs of routes or portions of routes (e.g., legs). The parameter database 2540 can be in communication with the route calculation module 2525 and any of the other sub-modules of the routing module 2500. In some embodiments, the parameter database 2540 can be communicatively coupled to the network 2445. As one example, the parameter database 2540 can include look-up tables of information related to average stop times for traffic lights based on statistical averages. The look-up tables can store different stop times for different times of the day for each traffic light. As another example, the parameter database 2540 can store historical or real-time traffic information. As yet another example, the parameter database 2540 can store terrain characteristics information, acceleration or deceleration data for various roadway slopes or incline angles and/or weather information.

In other embodiments, the parameter database(s) 2540 or other data repositories can reside on the client computing device 2435, at the dispatch center 2440, within a vehicle 2405, or at other remote locations communicatively coupled to the network 2445.

Other Route Cost Considerations

Although the description above has referred to an energy use cost, the cost of a route is not limited to energy use criteria; other constraints, factors, or variables can be used to determine overall cost using a composite cost function. The cost function can receive as inputs one or more criteria, factors, or variables. The cost function can also be constrained by one or more constraints.

For example, the cost of a route can depend on monetary factors other than energy. Such factors can include driver wage information, overtime information, estimated wear-and-tear or maintenance information (e.g., tire replacement costs, brake replacement costs), tollway costs, and the like. The money component can be a linear function of time; however, at least a portion of the money component can be non-linear (for example, when an overtime period is reached the monetary cost per unit time can deviate from a previous linear function).

In some embodiments, the time component of a cost function can be affected by, but is not limited to, the following: estimated transit time (which may include duration and/or time of day of start of travel), road closure information, road restrictions, hazardous weather information, mandatory break times, scheduling conflicts (e.g., weekends, holidays), and other travel limitations (e.g., portion of route requires travel on a ferry).

The relative importance of the energy use and time or money components can differ based on the circumstances. In some situations, the energy use component may be the most important consideration; however, in situations where time is of the essence to ensure delivery by a particular time, the time component can be most important. In some embodiments, the time can be the most important for one or more legs or portions of the route and then energy use can be the most important for the rest of the route. Thus, the weights assigned to the various factors of the components, or to the components overall, can be dynamic based and modifiable based on the circumstances.

In some embodiments, the cost of the routes is based solely on a single criterion or factor (e.g., distance or estimated transit time). In other embodiments, the cost of the routes is based on two or more criteria or factors (multivariate analysis). The factors used to determine the cost can be weighted based on importance, estimated or actual effect on energy use, or other criteria. In some embodiments, the cost can include an energy use component, a distance component, a time component, and/or a monetary cost component, as described above. Each of the components can be weighted as an overall component or each of the factors within the components can be individually weighted.

The cost can vary depending on particular vehicle characteristics and/or driving behaviors of particular drivers. For example, the energy use cost of a route may be different for a hybrid or electric vehicle than for a conventional internal combustion vehicle that uses gasoline due to energy efficiency and energy regeneration characteristics and capabilities of the vehicles. As another example, the distance component cost for an electric vehicle may be affected by the limited mileage range of electric vehicles without requiring a recharge. With reference to driving behavior, a particular driver may have a tendency toward aggressive driving that greatly reduces energy efficiency (e.g., miles per gallon) and thus increases energy use cost for the route.

Stop time or idling time of a route can greatly affect a route cost. For example, there can be one or more stop signs or stop lights along a leg of a route, each having an effect on the estimated transit time and/or energy use. For example, the stop signs and stop lights can decrease transit time due to slowing down and/or stopping in compliance with the stop signs and stop lights and can increase energy use due to the fact the vehicle must decelerate and accelerate, which results in loss of conservation of momentum. There may be a single generic cost number for all stop signs, yield signs, traffic lights, or other potential causes of delay. In some embodiments, there is a unique cost number or set of cost numbers for each particular traffic light. The cost associated with a stop sign or stop light can be a static number based on statistical averages that can be determined from a look-up table or other data storage implementation. The look-up table may have different entries for particular stop lights based on time of day.

Stop time or idling time can also refer to the time required for a service vehicle to complete a service job at a particular stop. In some embodiments, the stop time can be predetermined or static. For example, for a water delivery truck, the time to unload new water jugs for a water dispenser from a truck, carry them into a facility, and remove the empty water jugs can be determined to require a predetermined amount of time on average. However, in some embodiments, the stop time can be unknown, such as for a service vehicle that is assigned to repair appliances. In such scenarios, best-guess estimates based on historical data may have to be used for stop times.

The road parameters that can affect cost can include, for example, speed limits, road conditions, traffic information, turn information, and weather information. With respect to speed limits, routes with higher speed limits may increase energy use costs due to velocity-squared losses but may decrease estimated transit time costs. Routes with lower speed limits may decrease energy use costs but may increase estimated transit time costs. The speed limit information may also affect a type of vehicle selected for a particular route. For example, electric or hybrid vehicles may be used for routes with lower speed limits.

With respect to turn information, it may be advantageous to reduce the amount of turns on a route in general. For example, turns generally require a vehicle to slow down, which makes it difficult to conserve momentum and results in losses due to acceleration and deceleration. In addition, it may be advantageous for safety reasons or to reduce time and/or energy costs, to reduce or minimize the amount of either right-hand turns or left-hand turns depending on the side of the road that the vehicle will be driving. For example, for drivers in the U.S., left-hand turns may be reduced to avoid potential collisions in intersections from oncoming traffic and to avoid a potential increase in the stop time due to stop lights.

In some embodiments, the costs are static, based on ideal conditions or statistical predictions. In some embodiments, the costs are dynamic. For instance, the costs for traveling between stops in a road network may vary based on time of day, may vary based on the type of vehicle being driven, may vary based on a particular driver's characteristics, or may vary based on roadway parameters or conditions. As one example of a roadway parameter that may constrain the cost, a specific road may be restricted to passenger cars only. In this example, a semi-truck would be prohibited from traveling on the segment and the cost of traveling the road would, in some embodiments, be infinite (in the graph sense).

As one example of multivariate cost determination, the cost of a route R1 and a route R2 can be based on the factors of elevation change and distance. The distance factor can be weighted substantially lower than the elevation change factor to select energy use because the elevation change factor can substantially reduce energy use. For example, the distance factor could be weighted at 20% and the elevation change factor could be weighted at 80%. If the route R1 had a distance cost of 4 and an elevation change cost of 8, then the total cost for route R1 would be 7.2. If the route R2 had a distance cost of 8 and an elevation change cost of 2, then the total cost for route R2 would be 3.2.

As another example of a multivariate cost determination, each route or leg of a route can include an energy use cost, a time cost, and/or a monetary cost, as described above. In some embodiments, each of the energy use cost, the time cost, and the monetary cost is assigned a weight, as described above. According to the present example, the route R1 can have an energy use cost of 8 due to the elevation changes, a time cost of 2 due to the relatively short distance and a monetary cost of 5 to account for personnel costs (e.g., driver's wages) and vehicle maintenance costs. The route R2 can have an energy use cost of 2 due to the relatively constant slope, a time cost of 8 due to the relatively long distance and a monetary cost of 5.

Depending on the weights assigned to the various cost components, a different optimal route can be identified. If minimization of energy use is determined to be most important, then the energy use cost component can be weighted as 50%, the time cost can weighted as 30% and the monetary cost can be weighted as 20%. With these weights, the total cost of route R1 would be 5.6 and the total cost of route R2 would be 4.4. Therefore, route R2 would be the optimal route. However, if the time component is most important, then the cost components can be weighted as follows: energy use cost—20%, time cost—60% and monetary cost—20%. With these weights, the total cost of route R1 would be 3.8 and the total cost of route R2 would be 6.2. Therefore, route R1 would be the preferred or optimal route.

In some embodiments, the weights for each of the factors can be predetermined. In some embodiments, the weights are variable or constrained in real time based on, but not limited to, user input, stop characteristics (e.g., number of stop signs or traffic lights, statistical wait time for traffic lights), vehicle characteristics, driver characteristics, road parameters, speed limits, time of day, and/or other predetermined or real time criteria. For example, the weight for idling time for an electric vehicle may be substantially lower in proportion to the weight for idling time for an internal combustion vehicle. As another example, an aggressive driver with a driver profile of a hard accelerator and low miles per gallon can affect the weight assigned to the elevation change factor or the number of stops factor.

In accordance with some embodiments, the weights can be adjusted or at least based in part, on user input. For example, a user interface display can be presented to the user. The user interface can receive user input (e.g., textual input selections from a drop-down menu, checked boxes, etc.) that can provide operator override of the routing selection methods. The user inputs can be received from any user input device (e.g., keyboard, mouse, microphone, touchscreen). As one example, a particular stop on a route may have a mandatory delivery time. Accordingly, a user can provide input that causes the routing module to adjust the weights of the factors such that a route is selected that minimizes or reduces estimated transit time (e.g., the time cost component).

In some embodiments, a user can also provide input regarding the vehicle type to be used to calculate one or more routes. In some embodiments, the user interface allows for operator override to provide inputs that effect a change in the route as desired and/or required. In some instances, the operator override inputs may cause the routing module to ignore the weighting altogether. The input received from the user can be received or accessed by the dynamic re-routing process, thereby providing operator-activated re-routing.

Figure 26:
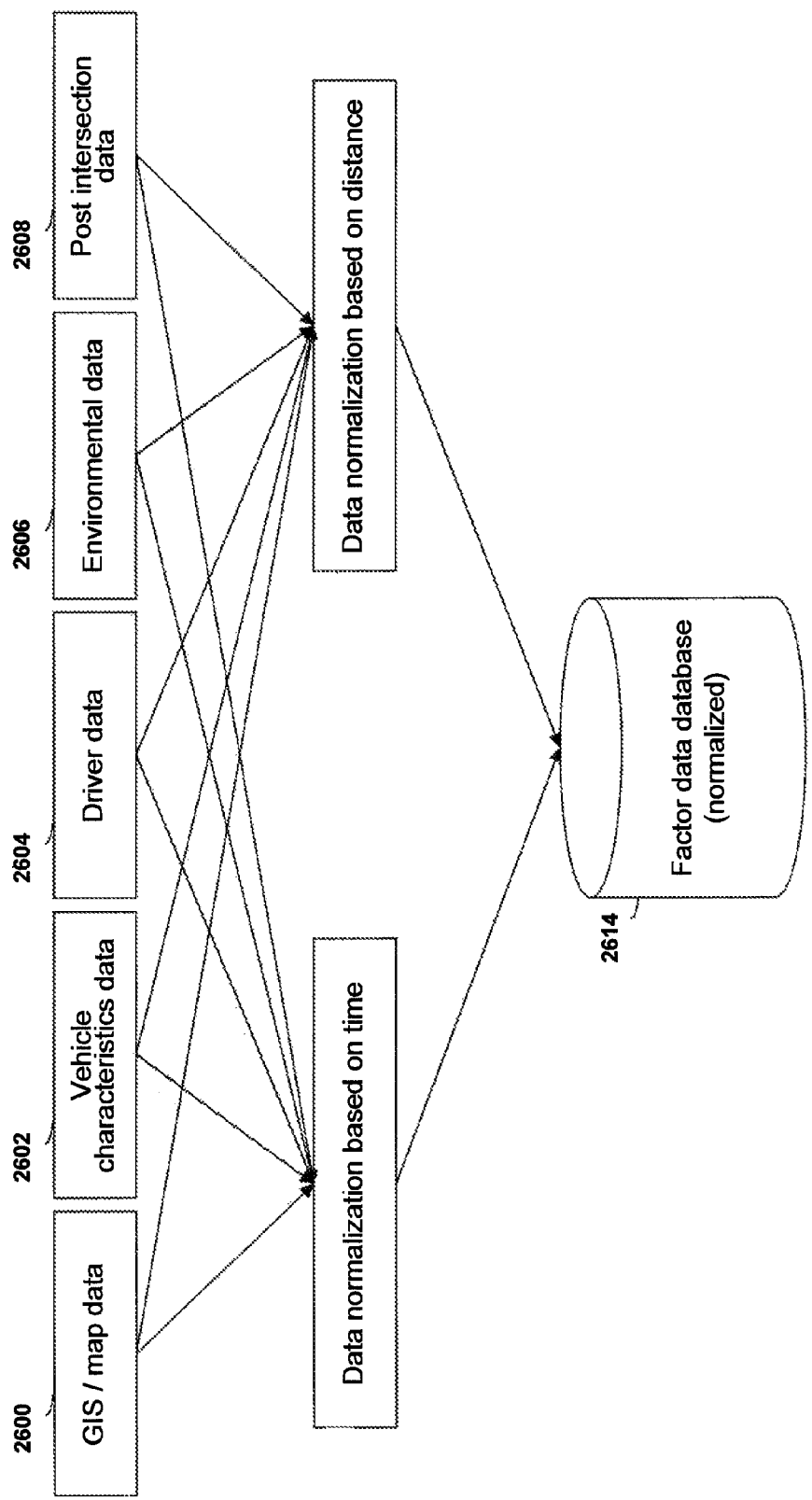
FIG. 26 illustrates an embodiment of a block diagram depicting various sources of factor data.

FIG. 26 illustrates an embodiment of a block diagram depicting various factor data or variables that can be inputted into the factor data database 2614. The factor data can be generated from a variety of sources, including but not limited to generated by third party data suppliers, developed internally by a client or fleet management company, provided by a driver of a vehicle, generated by the vehicle or a device in the vehicle obtaining measurements of the environment or the vehicle, produced by government agencies or non-government organizations, developed internally by the entity operating the route optimization system, or the like.

In an embodiment, the factor data database 2614 can comprise several categories of factor data or variables, including but not limited to GIS/map data 2600, vehicle characteristic data 2602, driver characteristic data 2604, environmental characteristic data 2606, and post-intersection characteristic data 2608. It will be appreciated by those skilled in the art that the factor data database 2614 can comprise other categories of factor data or variables. The route optimization systems disclosed herein can be configured to access the various factor data or variables stored within the factor data database 2614, which can be one database or a plurality of databases connected by a network connection. The factor data stored in the database 2614 can be used by the route optimization systems disclosed herein to input into multi-variate cost functions associated with route edges of a model representing a road network. For example, a route edge may be associated with a cost function wherein a variable in the cost function is an environmental data factor. In calculating the cost value or composite cost for a route edge, the route optimization system can be configured to access factor data database 2614 to obtain environmental factor data to be inputted into the cost function in order to calculate a cost value or composite cost for the particular route edge.

In an embodiment, GIS/map data 2600 can comprise a plurality of data factors. Examples of various GIS/map data factors or variables include but are not limited to geographic coordinates, route distance, speed limit, route travel time, elevation data, bridge data, incline data, obstruction data, construction data, road condition data (smooth road, bumpy road, etc.), road type data (e.g., dirt road, paved road, etc.), dwell time, turn data, and the like.

In an embodiment vehicle characteristics data 2602 can comprise various factor data or variables relating to any number of characteristics associated with a vehicle. The term "vehicle" as used herein can refer to, for example, a truck, car, plane, train, ship, bus, van, or the like. Examples of vehicle characteristic factor data include but are not limited to size of the vehicle (for example, length, width, height, or the like), vehicle type (for example, diesel vehicles, gasoline vehicles, electric vehicles, and hybrid vehicles, kinds of vehicle propulsion systems, tractor trailer, two axle truck, or the like), cargo load capacity, load/unload capabilities, driver requirements, vehicle weight, turning radius, vehicle government registration status, vehicle maintenance status, smog check status, vehicle fuel efficiency data or energy usage, vehicle usage requirement (electric, hybrid, gasoline, diesel, or the like), vehicle age data, and the like.

In an embodiment, driver data 2604 can comprise various factor data or variables related to characteristics of a driver of a vehicle. Examples of driver factor data include but are not limited to driver location data, driver qualifications for particular vehicles, driver history, number of years of experience data, driver qualifications for particular driving terrains, driver load type experience data, driver accident and other history data, driver speeding ticket data, driver pay rate data, driver arrest data, and the like.

In an embodiment environmental factor data 2606 can comprise various factor data or variables relating to the environment in which the vehicle is traveling. Examples of environmental factor data can include but are not limited to current weather conditions through which the vehicle is traveling, construction in the vicinity of the vehicle, traffic conditions near the vicinity of the vehicle, collision or accidents near the vehicle, data relating to malfunctioning traffic signals, low visibility in the vicinity, public events near the vicinity, and the like.

In an embodiment post-intersection factor data 2608 can comprise factor data or variables relating to route constraints at an upcoming intersection along the roadway traveled by a vehicle. Post-intersection factor data can comprise multi-edge constraint data. Examples of post-intersection factor data include but are not limited to left turn or right turn restrictions, long light signal waiting periods, one way streets, class of departure, roadway class constraints, narrow bridge, narrow road, overhead height limit constraints, restricted roadway, toll way, and the like.

As discussed herein, each edge, which represents a roadway in a road network, is associated with a cost function. The route optimization system can be configured to utilize the cost function to determine a cost value or composite cost for a particular vehicle to utilize the corresponding roadway. To calculate the cost value or composite cost from the cost function, the route optimization system inputs into the cost function factor data accessed from the fact data database 2614.

In order to utilize various factor data in a cost function, the factor data is normalized in certain embodiments. For example, factor data can be normalized based on time. Where factor data is normalized based on time, factor data are analyzed to determine whether a particular factor data increases the travel time of a vehicle or decreases the travel time of a vehicle. In an embodiment, if a factor data increases travel time the factor is assigned a positive number to contribute more to the calculated cost value. In an example where the factor data is determined to decrease the amount of travel time of a vehicle, then the factor data is assigned a negative number and/or a fractional number to contribute less to the calculated cost value.

In an embodiment, factor data can be normalized based on distance. For example, factor data can be analyzed to determine whether a particular factor data increases or decreases the travel distance of a vehicle. In an embodiment, if a factor data is determined to increase a vehicle travel distance, then the factor data can be assigned a positive number. In another example, if a factor data is determined to decrease the travel then the factor data can be assigned a negative number and/or a fractional number. It will be appreciated by those skilled in the art that data factor normalization can be based on a different type of metric in addition to time and distance.

The route optimization system can be configured to automatically generate normalized factor data based on receiving raw factor data. In other embodiments, the route optimization system can be configured to receive manually inputted normalization data from a user, for example, a driver of a vehicle or a fleet manager or the like. Normalized factor data can be generated dynamically and/or in real time, or normalized data can be generated on a periodic or batch basis. Normalized data can be stored in a look up table or other database that is accessible by the route optimization system.

In any embodiment cost functions can be configured to receive only factor data or variables normalized based on time. In other embodiments, cost functions can be configured to receive factor data or variables normalized based on distance. In other embodiments, cost functions can be configured to receive both data factors or variables normalized based on time and/or data factors or variables normalized based on distance and/or data factors or variables normalized based on another metric type.

Figure 27:
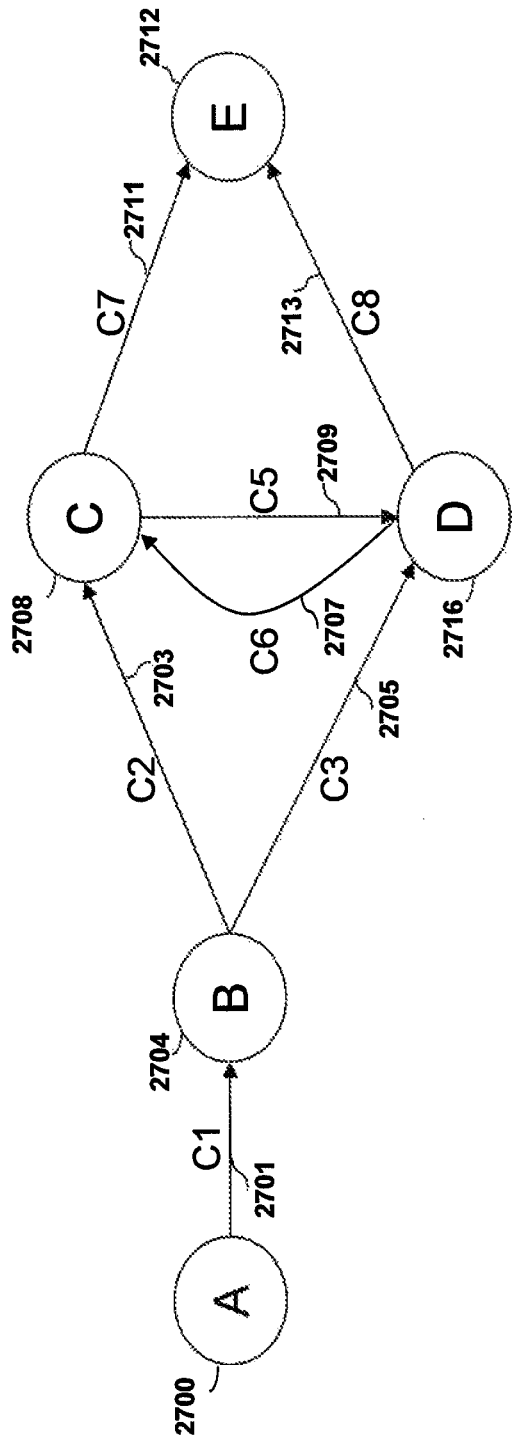
FIG. 27 illustrates an embodiment of a simplified abstraction of a road network wherein each edge is associated with a cost function.

With reference to FIG. 27, there is illustrated a simplified abstraction or model of a road network according to an embodiment. The model can comprise nodes 2700, 2704, 2708, 2716, 2712 and edges 2701, 2703, 2705, 2707, 2709, 2711, 2713. In an embodiment, nodes represent intersections in the road network and edges represent a roadway in the road network. As used herein, the term roadway includes without limitation streets, freeways, highways, toll roads, dirt roads, side roads, alley ways, service roads, water ways, rivers, oceans, flight path, or the like.

In an embodiment, the route optimization system can be configured to identify the various routes between node A 2700 and node E 2712. In identifying the various routes between node A and node B, the route optimization system can be configured to identify single edge constraints as well as multi-edge constraints. As described herein, a single edge constraint is a constraint on the roadway corresponding to the edge and the constraint does not affect any neighboring roadway. An example of a single edge constraint is a height restriction on a roadway. As disclosed herein, a multi-edge constraint represents a constraint that involves two or more roadways. An example of a multi-edge constraint includes but it not limited to no U-turns, no left turns, or no right turns, because each is a constraint on vehicle travel across two neighboring roadways.

In an embodiment the route optimization system can be configured to analyze the various routes between node A and node E to determine the route with the lowest cost value. To determine the lowest cost value route, the route optimization system can be configured to calculate a cost value for each edge in a particular route. In an embodiment, to calculate a cost value for a particular edge, the route optimization system is configured to generate the cost value by accessing and inputting factor variables into a cost function associated with the particular edge. In calculating the cost values associated with each edge of a particular route, the route optimization system can be configured to sum all of the cost values for a particular route to determine the total cost value of the route. In other embodiments, the route optimization system can be configured to generate the total cost value of a route by taking a product of all the cost values associated with each edge of the particular route. In other embodiments, the total cost value of a route is calculated by the route optimization system by a combination of a sum and product of the cost values associated with each edge of a particular route. In any of the foregoing embodiments, the route optimization system can be configured to apply a waiting factor to each of the cost values for the edges of a route. For example, certain edges may be more important than other edges for reaching a particular destination, in which case important edges are multiplied by a waiting factor.

In certain embodiments, cost functions can be based on one or more factor data elements as described herein. For example, factor data elements can be divided into several categories, such as map data factors, vehicle characteristic data factors, driver data factors, environmental data factors, and post-intersection data factors. In a particular cost function, waiting factors can be applied to various data factor elements. For example, if there is a particular data factor element or variable that is highly correlated to predicting and/or calculating the cost value of a particular edge, then the data factor element is assigned a waiting factor. If the data factor element is predictive or an important factor that reduces the cost value of a particular edge, then the waiting factor assigned to the data factor element can be a negative number or a fractional number. Similarly, if a particular data factor element or variable that is predictive or an important factor that increases the cost value of a particular edge, then the waiting factor assigned to the data factor element can be a positive whole number.

In an embodiment, the route optimization system can be configured to calculate the cost value of a particular edge in real time as the route optimization system analyzes each node in a model. For example, as illustrated in FIG. 27, the route optimization system can be configured to identify the route between A and E having the lowest cost value. To begin the analysis, the route optimization system can start at node A 2700. The route optimization system will follow edge 2701 to node B 2704 because at node A there are no other route options other than to advance to node B. At node B the route optimization system must make a choice between advancing to node C along edge 2703 or advancing to node D along edge 2705.

In an embodiment, the route optimization system can be configured to calculate the cost value of the edge 2703 and the cost value of the edge 2705 in real time. To calculate the cost values, the route optimization system analyzes the cost function C2 and inputs the necessary and relevant data factor elements into the cost function C2 to generate the cost value of traveling along edge 2703. The same process is performed for cost function C3. In an embodiment, the calculation of the cost values for the edges is performed in real time as the route optimization system analyzes each node and/or edge along a route. In other embodiments, the calculation of the cost values for the edges is performed on a periodic or batch basis such that the route optimization system accesses the cost values in a look-up table or other database. Calculating the cost values in real time can be advantages because if the route optimization system is installed in a mobile device, the mobile device may not have enough memory or storage to store all the cost values for each edge in a road network. Additionally, the calculation of cost values in real time can allow for more accurate cost values based on up to date data factors or variables.

After calculating the cost values, the route optimization system can be configured to select the edge having the lowest cost value. For example, if the cost value for the edge 2703 is lower than the cost value for the edge 2705, then the route optimization system can be configured to advance from node B to node C 2708 as the route optimization system attempts to determine the route between node A and node E having the lowest cost value.

Figure 28:
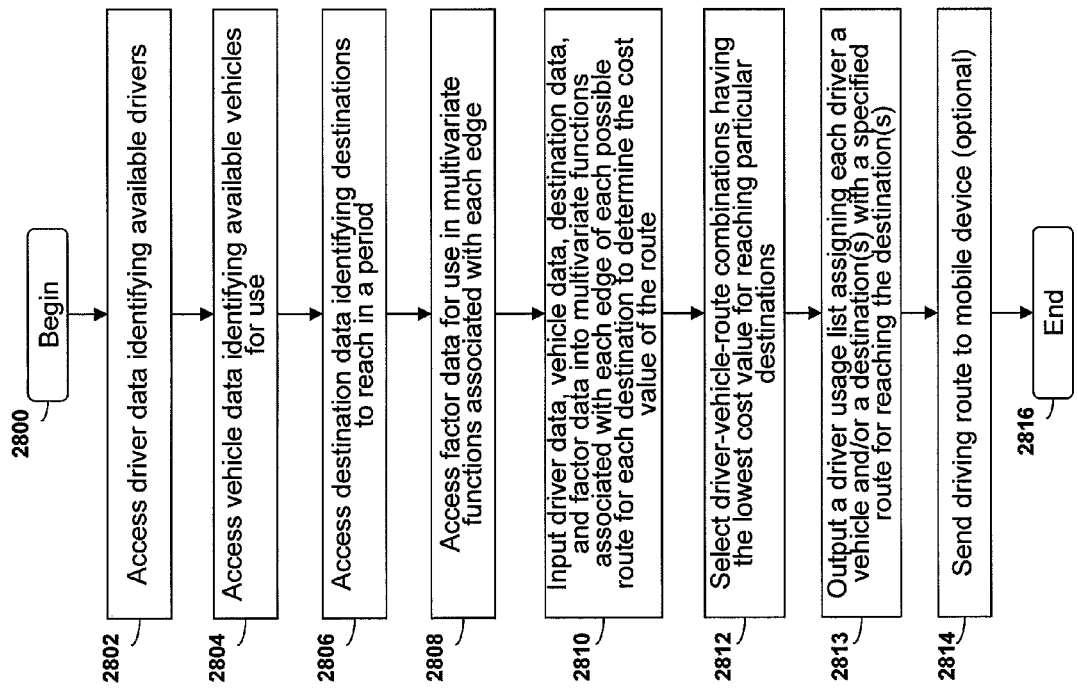
FIG. 28 illustrates an embodiment of a process for a route optimization system.

With reference to FIG. 28, there is illustrated an embodiment of a process flow for a route optimization system. The computer systems and hardware components disclosed herein can be used to perform this example process or other similar processes. At block 2800, the process can begin with accessing driver data at block 2802. Accessing driver data comprises determining the available drivers for a particular fleet of vehicles. Accessing driver data comprises obtaining from the factors data database 2614 driver characteristic data for each of the available drivers. At block 2804, the route optimization system can be configured to access vehicle data. Accessing vehicle data can comprise identifying the available vehicles for use by the route optimization system. Accessing vehicle data can also comprise obtaining from factors data database 2614 various vehicle characteristic data elements for the available vehicles for us. At block 2806, the route optimization system can be configured to access destination data. Accessing destination data can comprise identifying the various destinations to be reached in a particular period by the route optimization system. Accessing destination data can also comprise obtaining from the factors data database 2614 destination data factors such as map data, environmental data, and post-intersection data.

At block 2808, the route optimization system can be configured to access factor data for use in multi-variate functions associated with each edge for a particular route between a starting geographical location and a destination geographical location. At block 2810, the route optimization system can be configured to input the driver data elements, vehicle data elements, destination data elements, and other data factor elements into the multi-variate functions associated with each edge of each possible route for each destination to determine the cost value of the particular route. At block 2812, the route optimization system can be configured to select the driver-vehicle-route combinations having the lowest cost value for reaching particular destinations. At block 2813, the route optimization system can be configured to output a driver usage list assigning each driver to a particular vehicle and/or a destination with a specified route for reaching the destination. At block 2814, the route optimization system can be optionally configured to send the driving route to a mobile device possessed by a driver or a mobile device installed in a vehicle. In an embodiment, the driving route can provide real time directions to the driver that is driving to a particular destination. At block 2816, the process can end.

In an embodiment, block 2810 can be optionally repeated for each driver and/or each vehicle and/or each destination. For example, if there are two drivers and two vehicles and two destinations, the route optimization system can be configured to calculate the cost values associated with the eight various combinations or permutations of drivers-vehicles-destinations. After calculating all the various cost factors for the various different permutations, the route optimization system can be configured to store the various cost values into a grid or table or database. The route optimization system can be configured to choose the driver-vehicle-destination combinations with the lowest cost values. Based on these selections, the route optimization system can be configured to assign drivers to certain vehicles to travel to certain destinations.

Figure 29:
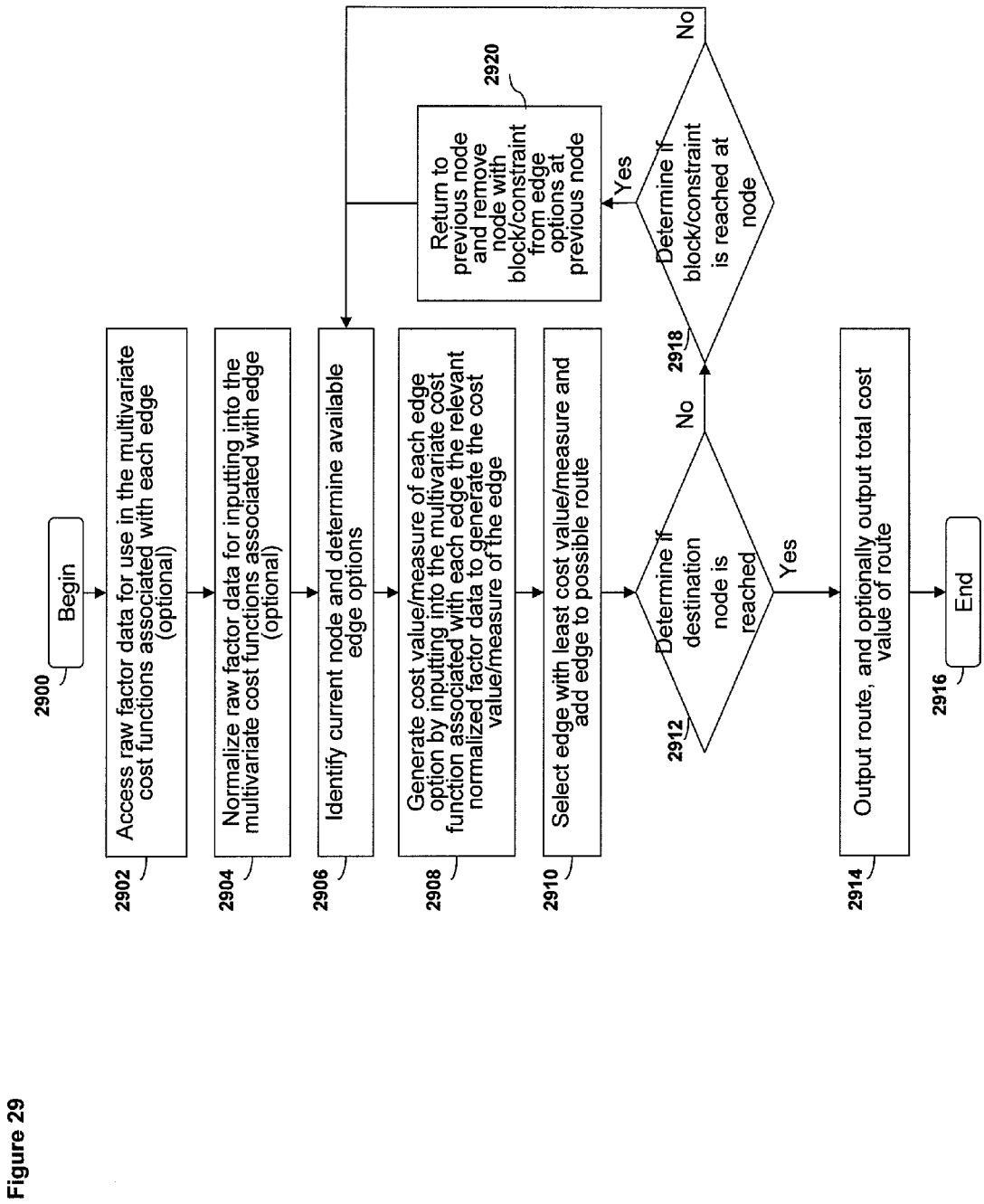
FIG. 29 illustrates an embodiment of a process for selecting a vehicle route.

With reference to FIG. 29, there is illustrated a process flow diagram of an embodiment of calculating a total cost value of a particular route. The computer systems and hardware components disclosed herein can be used to perform this example process or other similar processes. In certain embodiments, block 2810 of the process illustrated in FIG. 28 can employ the process illustrated in FIG. 29.

At block 2900, the process can begin by optionally accessing raw factor data at block 2902 for use in the multi-variate cost functions associated with each edge. At block 2904, the route optimization system can be configured to optionally normalize the raw factor data for inputting into the multi-variate cost functions associated with each edge. At block 2906, the route optimization system can be configured to identify the starting node or current node and determine the available edge options at the node. At block 2908, the route optimization system can be configured to generate cost value/measure of each edge option by inputting into the multi-variate cost function associated with each edge the relevant normalized factor data to generate the cost value/measure of the edge.

At block 2910, the route optimization system can be configured to select the edge with the least cost value/measure and add the selected edge to the possible route for reaching the destination geographical location. At decision block 2912, the route optimization system can be configured to determine if the destination node has been reached. If the destination node has been reached, the route optimization system can be configured to output the route and optionally output the total cost value of the route. After outputting the route at block 2914, the process can end at block 2916.

If at decision block 2912 the route optimization determines that the destination has not been reached, then at block 2918, the route optimization system can be configured to determine if a block or a constraint or termination is reached at the current node. An example of a block or constraint or termination can include but is not limited to a dead end, or a no right turn or no left turn that would lead to or advance to the destination node. If the route optimization system determines that there is no block or constraint or termination at the current node, then the route optimization system can be configured to return to block 2906 to identify the available edge options to determine the cost values and/or measures for each edge at block 2908. The process may continue until the route optimization system identifies or reaches the destination node. If at decision block 2918 the route optimization system identifies that a block or constraint has been reached, then the route optimization system can at block 2920 return to the previous node and remove the node with the block and/or constraint and/or termination from the edge options at the previous node. In an embodiment, the detection of a block or constraint or termination creates another universe for the route optimization system to analyze. Having returned to the previous node, the route optimization system at block 2906 can determine the available edge options minus the edge that leads to the node with the block or constraint. The process continues until the route optimization system can reach the destination node.

Figure 30:
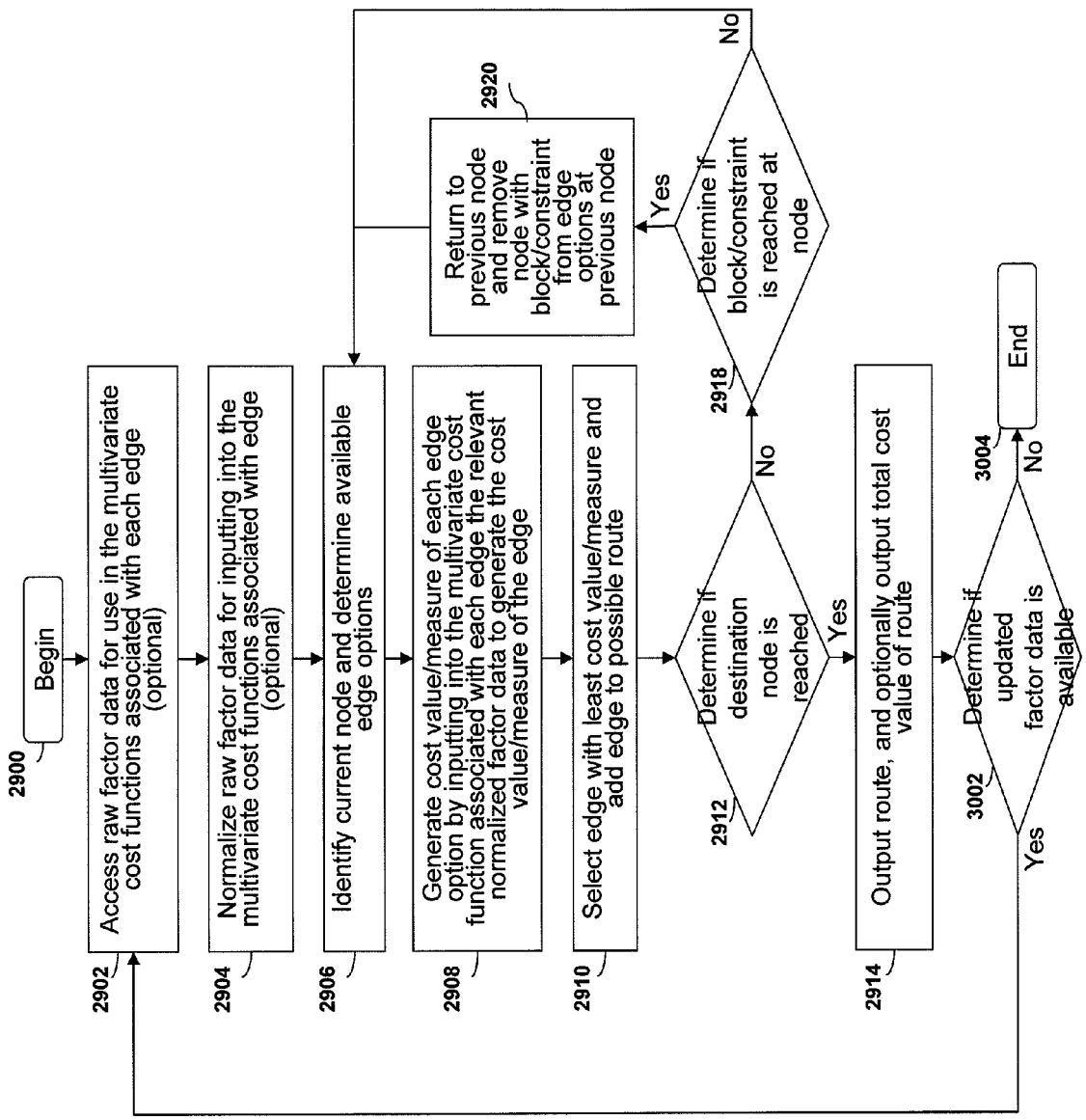
FIG. 30 illustrates an embodiment of a process for selecting a route with updated factor data.

With reference to FIG. 30, there is illustrated a similar process diagram as illustrated in FIG. 29. In this alternative process flow, cost values are updated after the route optimization system performs an initial calculation of the route value. For example, the route optimization system can be configured to dynamically update the route value for a particular edge or route by determining at block 3002 whether updated factor data is available. If updated factor data is available then the route optimization system can repeat the process by returning to block 2902. The determination at block 3002 can be performed by the route optimization system on a periodic basis while a driver is traveling down a particular route selected by the route optimization system. If the route optimization system determines at block 3002 that there is no updated factor data, then the route optimization system can be configured to end the process at block 3004.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although the inventions disclosed herein have been described in the context of certain preferred embodiments and examples, it will be understood by those skilled in the art that the present inventions extend beyond the specifically disclosed embodiments to other alternative embodiments and/or uses of the inventions and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present inventions herein disclosed should not be limited by the particular disclosed embodiments described above.

What is claimed is:

1. A computer-implemented method of vehicle routing optimization by using a multivariate function for calculating a route value, the vehicle routing optimization configured to determine an optimal driving route for a driver of a vehicle traveling between a starting geographical location and a destination geographical location, the computer-implemented method comprising:
    accessing the starting geographical location of the vehicle, the vehicle included as part of a vehicle fleet;
    accessing the destination geographical location of the vehicle;
    accessing a model from an electronic storage, the model representing a road network comprising the starting geographical location and the destination geographical location, the model comprising a plurality of nodes representing intersections of the road network and a plurality of edges representing roadways of the road network, wherein each edge connects at least two nodes in the model and has a cost value for the vehicle to travel along the roadway represented by the edge;
    determining at least one driving route for the vehicle traveling between the starting geographical location of the vehicle and the destination geographical location of the vehicle, each driving route comprising an ordered set of edges, wherein each edge comprises a multivariate cost function for determining the cost value for the vehicle to travel along the roadway represented by the edge;
    determining the route value for each of the at least one driving routes based on the cost values for each edge in the at least one driving routes;
    selecting the driving route from the at least one driving routes with the lowest route value;
    selecting a driver from a number of available drivers for the driving route based at least in part on energy-use characteristics associated with the driver; and
    transmitting the driving route, and a combination of an identity of the vehicle and an identity of the driver as determined by a routing module to a management device for presentation to a user,
    wherein the computer-implemented method is performed by a computer system that comprises one or more computing devices,
    wherein each multivariate cost function comprises variables, the variables comprising at least a mapping data variable and at least one of the following variables: vehicle characteristic data variable, environmental data variable, and driver data variable,
    wherein the cost value for each edge comprises a monetary cost value and each multivariate cost function further comprises a monetary cost function,
    wherein the driver data variable corresponds at least in part to energy-use characteristics associated with each of the available drivers, and
    wherein the combination of the identity of the vehicle and the identity of the driver is based at least in part on the energy-use characteristics and the cost values for each edge in the driving route.

2. The computer-implemented method of vehicle routing optimization of claim 1, wherein the model comprises multi-edge constraints.

3. The computer-implemented method of vehicle routing optimization of claim 1, wherein determining the route value for each of the at least one driving routes is based on a summation of the cost values for each edge in the at least one driving routes.

4. The computer-implemented method of vehicle routing optimization of claim 1, wherein determining the route value for each of the at least one driving routes is based on a product of the cost values for each edge in the at least one driving routes.

5. The computer-implemented method of vehicle routing optimization of claim 1, wherein determining the route value for each of the at least one driving routes is based on a combination of a summation and a product of the cost values for each edge in the at least one driving routes.

6. The computer-implemented method of vehicle routing optimization of claim 1, wherein each multivariate cost function comprises weighting factors applied to the variables.

7. The computer-implemented method of vehicle routing optimization of claim 1, wherein the mapping data variable comprises one or more factors including: geographical coordinates, route distance, speed limit for a roadway, route travel time, elevation data, bridge data, and incline data.

8. The computer-implemented method of vehicle routing optimization of claim 1, wherein the vehicle characteristic variable comprises one or more factors including: vehicle type, vehicle size, vehicle load, and driver technical requirements.

9. The computer-implemented method of vehicle routing optimization of claim 8, wherein the vehicle type at least includes a diesel vehicle and a hybrid vehicle.

10. The computer-implemented method of vehicle routing optimization of claim 8, wherein the vehicle type at least includes a diesel vehicle, a gasoline vehicle, an electric vehicle, and a hybrid vehicle.

11. The computer-implemented method of vehicle routing optimization of claim 1, wherein the environmental data variable comprises one or more factors including: weather conditions, roadway construction conditions, and traffic conditions.

12. The computer-implemented method of vehicle routing optimization of claim 1, wherein the driver data variable comprises one or more factors including: driver education qualifications, hours driven by driver, and driver experience.

13. The computer-implemented method of vehicle routing optimization of claim 1, wherein the variables further comprise post intersection variable data, the post intersection variable data comprising one or more factors including: no left turn restriction, no right turn restriction, long light, one-way street, roadway class, roadway weigh restriction, narrow bridge or roadway condition, and height limit restriction.

14. The computer-implemented method of vehicle routing optimization of claim 1, wherein the variables inputted into the multivariate cost functions are normalized on a time basis or a distance basis.

15. The computer-implemented method of vehicle routing optimization of claim 1, wherein the computer-implemented method is performed on a periodic basis by inputting updated variables into the multivariate cost functions of the edges.

16. The computer-implemented method of vehicle routing optimization of claim 1, wherein the computer-implemented method is performed for a plurality of drivers and a plurality of vehicles and plurality of destination geographical locations to determine the combinations of drivers-vehicles-destinations that produce the lowest cost values.

17. A non-transitory storage medium having a computer program stored thereon for causing a suitably programmed system to process computer-program code by performing a method of vehicle routing optimization by using a multivariate function for calculating a route value, the vehicle routing optimization configured to determine an optimal driving route for a driver of a vehicle traveling between a starting geographical location and a destination geographical location, the method comprising:
    accessing the starting geographical location of the vehicle, the vehicle included as part of a vehicle fleet;
    accessing the destination geographical location of the vehicle;
    accessing a model from an electronic storage, the model representing a road network comprising the starting geographical location and the destination geographical location, the model comprising a plurality of nodes representing intersections of the road network and a plurality of edges representing roadways of the road network, wherein each edge connects at least two nodes in the model and has a cost value for the vehicle to travel along the roadway represented by the edge;
    determining at least one driving route for the vehicle traveling between the starting geographical location of the vehicle and the destination geographical location of the vehicle, each driving route comprising an ordered set of edges, wherein each edge comprises a multivariate cost function for determining the cost value for the vehicle to travel along the roadway represented by the edge;
    determining the route value for each of the at least one driving routes based on the cost values for each edge in the at least one driving routes;
    selecting the driving route from the at least one driving routes with the lowest route value;
    selecting a driver from a number of available drivers for the driving route based at least in part on energy-use characteristics associated with the driver; and
    transmitting the driving route, and a combination of an identity of the vehicle and an identity of the driver as determined by a routing module to a management device for presentation to a user,
    wherein the method is performed by a computer system that comprises one or more computing devices,
    wherein each multivariate cost function comprises variables, the variables comprising at least a mapping data variable and at least one of the following variables: vehicle characteristic data variable, environmental data variable, and driver data variable,
    wherein the cost value for each edge comprises a monetary cost value and each multivariate cost function further comprises a monetary cost function,
    wherein the driver data variable corresponds at least in part to energy-use characteristics associated with each of the available drivers, and
    wherein the combination of the identity of the vehicle and the identity of the driver is based at least in part on the energy-use characteristics and the cost values for each edge in the driving route.

18. The non-transitory storage medium of claim 17, wherein the model comprises multi-edge constraints.

19. The non-transitory storage medium of claim 17, wherein determining the route value for each of the at least one driving routes is based on a summation of the cost values for each edge in the at least one driving routes.

20. The non-transitory storage medium of claim 17, wherein determining the route value for each of the at least one driving routes is based on a product of the cost values for each edge in the at least one driving routes.

21. The non-transitory storage medium of claim 17, wherein determining the route value for each of the at least one driving routes is based on a combination of a summation and a product of the cost values for each edge in the at least one driving routes.

22. The non-transitory storage medium of claim 17, wherein each multivariate cost function comprises weighting factors applied to the variables.

23. The non-transitory storage medium of claim 17, wherein the mapping data variable comprises one or more factors including:
    geographical coordinates, route distance, speed limit for a roadway, route travel time, elevation data, bridge data, and incline data.

24. The non-transitory storage medium of claim 17, wherein the vehicle characteristic variable comprises one or more factors including:
    vehicle type, vehicle size, vehicle load, and driver technical requirements.

25. The non-transitory storage medium of claim 24, wherein the vehicle type at least includes a diesel vehicle and a hybrid vehicle.

26. The non-transitory storage medium of claim 24, wherein the vehicle type at least includes a diesel vehicle, a gasoline vehicle, an electric vehicle, and a hybrid vehicle.

27. The non-transitory storage medium of claim 17, wherein the environmental data variable comprises one or more factors including:
    weather conditions, roadway construction conditions, and traffic conditions.

28. The non-transitory storage medium of claim 17, wherein the driver data variable comprises one or more factors including: driver education qualifications, hours driven by driver, and driver experience.

29. The non-transitory storage medium of claim 17, wherein the variables further comprise post intersection variable data, the post intersection variable data comprising one or more factors including: no left turn restriction, no right turn restriction, long light, one-way street, roadway class, roadway weigh restriction, narrow bridge or roadway condition, and height limit restriction.

30. The non-transitory storage medium of claim 17, wherein the variables inputted into the multivariate cost functions are normalized on a time basis or a distance basis.

31. The non-transitory storage medium of claim 17, wherein the method is performed on a periodic basis by inputting updated variables into the multivariate cost functions of the edges.

32. The non-transitory storage medium of claim 17, wherein the method is performed for a plurality of drivers and a plurality of vehicles and plurality of destination geographical locations to determine the combinations of drivers-vehicles-destinations that produce the lowest cost values.

33. A computer system for vehicle routing optimization by using a multivariate function for calculating a route value, the vehicle routing optimization configured to determine an optimal driving route for a driver of a vehicle traveling between a starting geographical location and a destination geographical location, the computer system comprising:
 a start location module configured to access the starting geographical location of the vehicle, the vehicle included as part of a vehicle fleet;
 a destination location module configured to access the destination geographical location of the vehicle;
 a data access module configured to access a model from an electronic storage, the model representing a road network comprising the starting geographical location and the destination geographical location, the model comprising a plurality of nodes representing intersections of the road network and a plurality of edges representing roadways of the road network, wherein each edge connects at least two nodes in the model and has a cost value for the vehicle to travel along the roadway represented by the edge;
 a route determination module configured to determine at least one driving route for the vehicle traveling between the starting geographical location of the vehicle and the destination geographical location of the vehicle, each driving route comprising an ordered set of edges, wherein each edge comprises a multivariate cost function for determining the cost value for the vehicle to travel along the roadway represented by the edge;
 a route value module configured to determine the route value for each of the at least one driving routes based on the cost values for each edge in the at least one driving routes;
 a route selection module configured to select the driving route from the at least one driving routes with the lowest route value;
 a driver selection module configured to select a driver from a number of available drivers for the driving route based at least in part on energy-use characteristics associated with the driver; and
 a communication module configured to transmit the driving route, and a combination of an identity of the vehicle and an identity of the driver to a management device for presentation to a user,
 wherein the computer system comprises one or more computing devices,
 wherein each multivariate cost function comprises variables, the variables comprising at least a mapping data variable and at least one of the following variables: vehicle characteristic data variable, environmental data variable, and driver data variable;
 wherein the cost value for each edge comprises a monetary cost value and each multivariate cost function further comprises a monetary cost function,
 wherein the driver data variable corresponds at least in part to energy-use characteristics associated with each of the available drivers, and
 wherein the combination of the identity of the vehicle and the identity of the driver is based at least in part on the energy-use characteristics and the cost values for each edge in the driving route.

34. The computer system of claim 33, wherein the model comprises multi-edge constraints.

35. The computer system of claim 33, wherein determining the route value for each of the at least one driving routes is based on a summation of the cost values for each edge in the at least one driving routes.

36. The computer system of claim 33, wherein determining the route value for each of the at least one driving routes is based on a product of the cost values for each edge in the at least one driving routes.

37. The computer system of claim 33, wherein determining the route value for each of the at least one driving routes is based on a combination of a summation and a product of the cost values for each edge in the at least one driving routes.

38. The computer system of claim 33, wherein each multivariate cost function comprises weighting factors applied to the variables.

39. The computer system of claim 33, wherein the mapping data variable comprises one or more factors including: geographical coordinates, route distance, speed limit for a roadway, route travel time, elevation data, bridge data, and incline data.

40. The computer system of claim 33, wherein the vehicle characteristic variable comprises one or more factors including: vehicle type, vehicle size, vehicle load, and driver technical requirements.

41. The computer system of claim 40, wherein the vehicle type at least includes a diesel vehicle and a hybrid vehicle.

42. The computer system of claim 40, wherein the vehicle type at least includes a diesel vehicle, a gasoline vehicle, an electric vehicle, and a hybrid vehicle.

43. The computer system of claim 33, wherein the environmental data variable comprises one or more factors including: weather conditions, roadway construction conditions, and traffic conditions.

44. The computer system of claim 33, wherein the driver data variable comprises one or more factors including: driver education qualifications, hours driven by driver, and driver experience.

45. The computer system of claim 33, wherein the variables further comprise post intersection variable data, the post intersection variable data comprising one or more factors including: no left turn restriction, no right turn restriction, long light, one-way street, roadway class, roadway weigh restriction, narrow bridge or roadway condition, and height limit restriction.

46. The computer system of claim 33, wherein the variables inputted into the multivariate cost functions are normalized on a time basis or a distance basis.

47. The computer system of claim 33, wherein the method is performed on a periodic basis by inputting updated variables into the multivariate cost functions of the edges.

48. The computer system of claim 33, wherein the method is performed for a plurality of drivers and a plurality of vehicles and plurality of destination geographical locations to determine the combinations of drivers-vehicles-destinations that produce the lowest cost values.

* * * * *